United States Patent
Powell et al.

(10) Patent No.: US 12,358,207 B2
(45) Date of Patent: Jul. 15, 2025

(54) APPARATUS AND METHOD FOR PRESSING A WORKPIECE

(71) Applicant: Skate One Corp., Goleta, CA (US)

(72) Inventors: George A. Powell, Goleta, CA (US); Michael T. Mete, Santa Barbara, CA (US)

(73) Assignee: Skate One Corp., Goleta, CA (US)

( * ) Notice: Subject to any disclaimer, the term of this patent is extended or adjusted under 35 U.S.C. 154(b) by 0 days.

(21) Appl. No.: 18/371,205

(22) Filed: Sep. 21, 2023

(65) Prior Publication Data

US 2024/0009918 A1    Jan. 11, 2024

Related U.S. Application Data

(63) Continuation of application No. 17/180,230, filed on Feb. 19, 2021, now abandoned.
(Continued)

(51) Int. Cl.
*B29C 63/00*    (2006.01)
*B29C 63/02*    (2006.01)
(Continued)

(52) U.S. Cl.
CPC .......... *B29C 63/02* (2013.01); *B29C 63/0004* (2013.01); *B29C 63/0065* (2013.01);
(Continued)

(58) Field of Classification Search
CPC ... B29C 63/02; B29C 63/025; B29C 63/0004; B29C 63/0065; B29C 66/81457;
(Continued)

(56) References Cited

U.S. PATENT DOCUMENTS

| 3,173,974 A | 3/1965 | Mohr |
| 5,736,618 A | 4/1998 | Poloso |

(Continued)

FOREIGN PATENT DOCUMENTS

| WO | WO-8701297 A1 | 3/1987 |
| WO | WO-2019217053 A1 | 11/2019 |

OTHER PUBLICATIONS

Ahmed., et al., "Analyzing and improving viscoelastic properties of high density polyethylene", ProQuest Dissertations and Theses; Thesis (M.S.)-Oklahoma State University 50-02, p. 1245 (Dec. 2011).

(Continued)

*Primary Examiner* — John L Goff, II
(74) *Attorney, Agent, or Firm* — COOLEY LLP

(57) ABSTRACT

An apparatus for pressing a multi-layered skateboard deck having a variation in thickness is provided. The apparatus includes a mold assembly, a first liner, and a second liner. The mold assembly includes a first mold having a first surface and a second mold having a second surface. The first surface and the second surface are configured to collectively define a mold cavity configured to receive the multi-layered skateboard deck. The first liner is disposed adjacent to the first surface and the second liner is disposed adjacent to the second surface. The mold assembly is configured to apply a load when the multi-layered skateboard deck is disposed in the mold cavity. At least one of the first liner or the second liner is configured to deform in response to the applied load such that the multi-layered skateboard deck is compressed with a substantially uniform pressure.

12 Claims, 10 Drawing Sheets

Related U.S. Application Data

(60) Provisional application No. 62/979,820, filed on Feb. 21, 2020.

(51) Int. Cl.
*B29K 711/14* (2006.01)
*B29L 31/52* (2006.01)

(52) U.S. Cl.
CPC ... *B29K 2711/14* (2013.01); *B29K 2995/0046* (2013.01); *B29L 2031/52* (2013.01)

(58) Field of Classification Search
CPC .......... B29C 2043/3655; B29C 70/549; B29K 2711/14; B29K 2995/0046; B29L 2031/52; B32B 2037/264; B32B 2037/266; B30B 15/024; B28B 3/024; A63C 17/01–018; Y10T 156/109; Y10T 156/1093
USPC .............................. 156/323, 245, 581, 583.3
See application file for complete search history.

(56) References Cited

U.S. PATENT DOCUMENTS

| | | | |
|---|---|---|---|
| 6,379,593 | B1 | 4/2002 | Datzmann et al. |
| 6,460,868 | B2 | 10/2002 | Madrid |
| 7,748,725 | B2 | 7/2010 | Piumarta |
| 8,087,681 | B2 | 1/2012 | Piumarta |
| 8,574,705 | B2 | 11/2013 | Hunter |
| 10,137,357 | B1 | 11/2018 | Rosolowski et al. |
| 2006/0276087 | A1 | 12/2006 | Conner, Jr. |
| 2007/0132141 | A1 | 6/2007 | Pleskunas |
| 2009/0014498 | A1 | 1/2009 | Matsumura |
| 2009/0108554 | A1 | 4/2009 | Boyle et al. |
| 2021/0260814 | A1 | 8/2021 | Powell et al. |

OTHER PUBLICATIONS

MatWeb, LLS, Compressive Strength Testing of Plastics, 2 pages (1996-2023).

International Search Report and Written Opinion for International Application No. PCT/US2021/018900, mailed Jun. 2, 2021, 10 pages.

APPARATUS AND METHOD FOR PRESSING A WORKPIECE

CROSS-REFERENCE TO RELATED APPLICATIONS

This application is a continuation of U.S. patent application Ser. No. 17/180,230, filed Feb. 19, 2021, now abandoned, entitled "Apparatus and Method for Pressing a Workpiece," which claims priority to and the benefit of U.S. Provisional Patent Application No. 62/979,820, filed Feb. 21, 2020, entitled "Apparatus and Method for Pressing a Workpiece," the disclosure of each of which is incorporated herein by reference in its entirety.

BACKGROUND

The present disclosure relates generally to manufacturing skateboard decks, and in particular, to apparatus and methods for pressing a skateboard deck having a variation in thickness.

In general, skateboard decks are formed from multiple layers of material that are bonded together and pressed into a desired shape. For example, some traditional skateboard decks include seven plies or layers of wood (e.g., maple wood) that are bonded using an adhesive and pressed into a desired shape that can have any number of contours. Moreover, maple wood is often desirable due to the relative hardness of the wood, which results in a skateboard deck having a desirable balance between stiffness and flexibility. Some known skateboard decks (e.g., 7-ply maple decks, and/or the like), however, can lose their 'pop' (e.g., stiffness or rigidity) in as little as a few days as a result of (1) the properties of the materials used in their construction (e.g., properties of the woods, glues, and/or interactions therebetween) and/or (2) environmental conditions (e.g., humidity, amount of use, weight of the user, etc.).

Various changes in the materials and construction of skateboard decks have been attempted in an effort to mitigate the challenges associated with maintaining a desired stiffness during the life of the deck. For example, epoxy (e.g., epoxy resin) has been used as an alternative to traditional wood glue (e.g., polyvinyl acetate (PVA)) for bonding the multiple plies or layers of some known decks but epoxy is heavier than the traditional wood glue and does not bond as well to the wood plies. Moreover, many epoxies are traditionally cured at temperatures above 212° F., which may be undesirable as moisture in the wood plies or layers could be boiled out of the wood, thereby reducing a flexibility of the resulting decks that can increase a likelihood of the deck cracking or breaking during use. Some attempts have been made to use adhesives such as snap cure epoxies (e.g., used in pre-impregnated, or 'pre-preg' fiber composites) that can cure at low temperatures (e.g., 350° F.). These types of epoxies are generally most compatible for use with the cores of items such as skis or snowboards, which are made of wood and composts that have been double and triple kiln dried to prevent moisture from steaming out of the cores. This process, however, is not feasible in mass-produced, low-priced skateboard decks.

In other instances, adding or otherwise using other materials, such as off-the-shelf fiberglass cloth or off-the-shelf stich bonded fiberglass (e.g., like that used by many snowboard manufacturers), has been attempted but may produce undesirable mechanical and/or structural characteristics in the resulting deck that may not be compatible with acts performed by skateboarders (e.g., some such decks can feel too 'harsh' or rigid). While substituting certain wood layers or adding layers or regions with such fiberglass materials can increase a stiffness of a deck without making the deck feel too harsh or rigid, the variations in the material layers and/or thickness of the deck can present challenges in the manufacturing of such decks. For example, some known processes of pressing the layers may result in certain layers being crushed or undesirably compressed, which in turn, may introduce stress concentration risers and/or the like that can lead to weak points at which the decks may break during use.

Accordingly, there is a need for a solution by which to overcome the aforementioned problems, such as those associated with the loss of 'pop' and uneven stress distributions, so as to improve the durability, reliability, and overall utility of skateboard decks without undue increases in costs.

SUMMARY

According to an aspect of the present disclosure, an apparatus for pressing a multi-layered skateboard deck having a variation in thickness is provided. The apparatus includes a mold assembly, a first liner, and a second liner. The mold assembly includes a first mold having a first surface and a second mold having a second surface. The first surface and the second surface are configured to collectively define a mold cavity configured to receive the multi-layered skateboard deck. The first liner is disposed adjacent to the first surface and the second liner is disposed adjacent to the second surface. The mold assembly is configured to apply a load when the multi-layered skateboard deck is disposed in the mold cavity. At least one of the first liner or the second liner is configured to deform in response to the applied load such that the multi-layered skateboard deck is compressed with a substantially uniform pressure.an apparatus for pressing a workpiece having a variation in thickness is provided.

BRIEF DESCRIPTION OF THE DRAWINGS

The drawings are not necessarily to scale. The drawings are presented by way of example only and not limitation. In the drawings, like reference characters refer to like elements (e.g., functionally similar and/or structurally similar elements).

DETAILED DESCRIPTION

Figure 1:
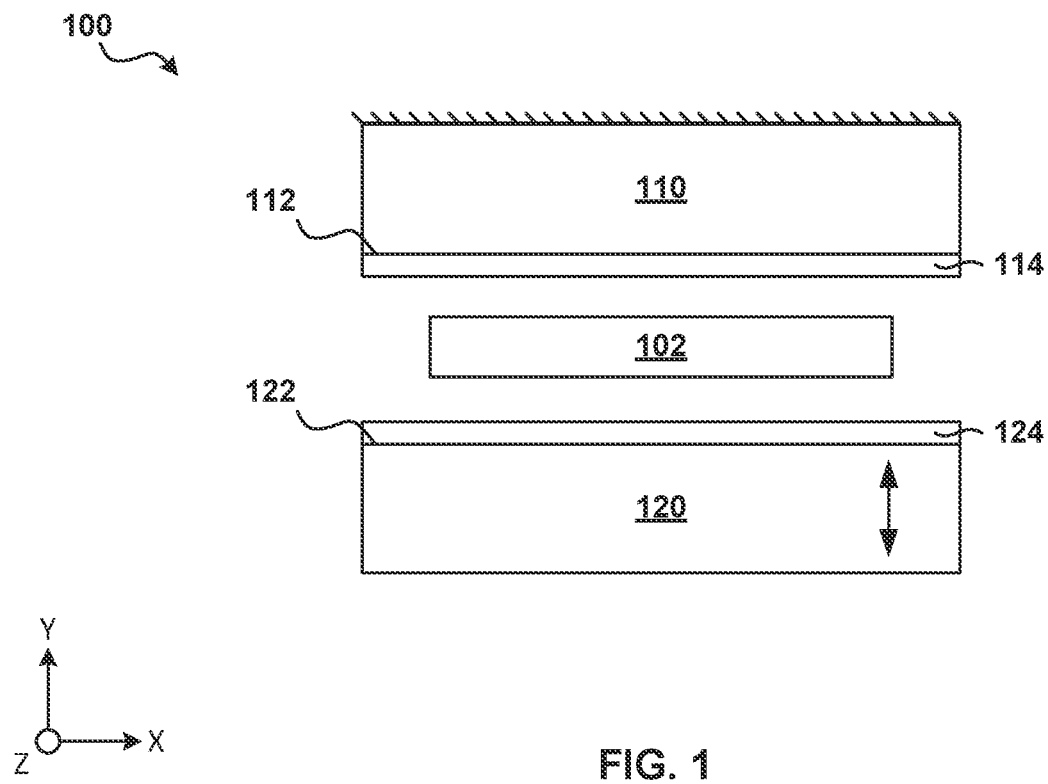
FIGS. 1 and 2 are schematic depictions of a mold assembly during different steps of a process of pressing a workpiece having a variation in thickness, according to an embodiment.

Embodiments of the present disclosure are directed to a press assembly (or components, features, and/or aspects thereof) and a method for pressing a workpiece having a variation in thickness. In some implementations, the workpiece can be, for example, a skateboard deck that has a variation in thickness along at least a portion of the deck. In other implementations, the workpiece can be any suitable member or collection of members. In some embodiments, an apparatus for pressing a multi-layered skateboard deck having a variation in thickness includes a mold assembly, a first liner, and a second liner. The mold assembly includes a first mold having a first surface and a second mold having a second surface. The first surface and the second surface are configured to collectively define a mold cavity configured to receive the multi-layered skateboard deck. The first liner is disposed adjacent to the first surface and the second liner is disposed adjacent to the second surface. The mold assembly is configured to apply a load when the multi-layered skateboard deck is disposed in the mold cavity. At least one of the first liner or the second liner is configured to deform in response to the applied load such that the multi-layered skateboard deck is compressed with a substantially uniform pressure.

In some embodiments, an apparatus for pressing a multi-layered skateboard deck having a variation in thickness includes a first mold having a first surface and a second mold having a second surface. The first surface of the first mold and the second surface of the second mold collectively define a mold cavity configured to receive the multi-layered skateboard deck having the variation in thickness. At least one of the first mold or the second mold is configured to be moved to compress the mold cavity and apply a load on the multi-layered skateboard deck when disposed in the mold cavity. A first liner is removably coupleable to the first surface and defines a set of recesses. A second liner is removably coupleable to the second surface and is configured to deform in response to the applied load operable to compress the multi-layered skateboard deck disposed in the mold cavity with a substantially uniform pressure.

In some implementations, a method for pressing a skateboard deck having a plurality of layers and at least one variation in thickness includes disposing the skateboard deck in a mold cavity of a mold assembly. The mold assembly includes a first mold, a second mold, a first liner removably coupled to the first mold, and a second liner removably coupled to the second liner. The first liner and the second liner collectively define the mold cavity. The mold assembly is actuated to move at least one of the first mold or the second mold. A load is applied on the skateboard deck via the first liner and the second liner as a result of moving the at least one of the first mold or the second mold. At least one of the first liner or the second liner is deformed in response to the applied load to compress the skateboard deck with a substantially uniform pressure.

Advantageously, various embodiments of the present disclosure can be implemented to produce and/or form objects such as skateboard decks having greater strength and/or reduced weight. Moreover, the skateboard decks manufactured according to various embodiments of the present disclosure can retain a 'pop' characteristic over longer periods of time compared to, for example, standard 7-ply maple decks—even in cases of heavy usage by professional skateboarders or the like. Moreover, various embodiments of the present disclosure can be implemented to produce and/or form skateboard decks that do not use traditional cross plies (e.g., used in standard 7-ply skateboard decks which can include 3 core plies, 2 cross plies, and 2 face plies, which are varied in direction to increase deck strength and/or stop the deck from splitting). Moreover, various embodiments of the present disclosure can be implemented to press a skateboard deck (or any other suitable workpiece) having one or more variations in thickness using and/or applying a substantially uniform pressure. Advantageously, this results in a substantially uniform stress distribution in the resulting skateboard deck that is substantially free of stress concentrations, stress risers, and the like, as described herein. To this end, various embodiments of the present disclosure can be implemented to provide, for example, a skateboard deck (or any other suitable workpiece) that can exhibit one or more of a reduced overall mass, a more durable curvature, a more uniform stress distribution, and/or similar characteristic(s) when compared to a traditional skateboard deck, as described in further detail herein.

Detailed embodiments of the present disclosure are disclosed herein for purposes of describing and illustrating claimed structures and methods that may be embodied in various forms and are not intended to be exhaustive in any way or limited to the disclosed embodiments. Modifications and variations will be apparent without departing from the scope of the disclosed embodiments to those skilled in the art. The terminology used herein was chosen to best explain the principles of the one or more embodiments, practical applications, or technical improvements over current technologies, or to enable understanding of the embodiments disclosed herein. As described, details of well-known features and techniques may be omitted to avoid unnecessarily obscuring the embodiments of the present disclosure.

As used in this specification, the singular forms "a," "an" and "the" include plural referents unless the context clearly dictates otherwise. Thus, for example, the term "a device" is intended to mean a single device or a combination of devices, "a network" is intended to mean one or more networks, or a combination thereof.

References in the specification to "one embodiment," "an embodiment," "an example embodiment," "some embodiments," and/or the like, indicate that the embodiment(s) described may include one or more particular features, structures, or characteristics, but it shall be understood that such particular features, structures, or characteristics may or may not be common to each and every embodiment disclosed herein. Moreover, such phrases do not necessarily refer to any one particular embodiment per se. As such, when one or more particular features, structures, or characteristics is described in connection with an embodiment or embodiments, as the case may be, it should be understood to those skilled in the art that the one or more features, structures, or characteristics can be included in one or more other embodiments, where applicable or when such embodiments are not mutually exclusive, whether or not explicitly described.

As used herein, the terms "about" and "approximately" generally mean plus or minus 10% of the value stated. For example, about 0.5 would include 0.45 and 0.55, about 10 would include 9 to 11, about 1000 would include 900 to 1100, etc.

As used herein, the term "substantially", such as when used in connection with geometric structures, relationships, and/or the like is intended to convey that the structure, relationship, and/or the like so defined is nominally the structure, relationship, and/or the like. As one example, a portion of a member that is described as being "substantially linear" is intended to convey that, although linearity of the portion is desirable, some non-linearity can occur in a "substantially linear" portion. Such non-linearity can result from manufacturing tolerances, or other practical considerations (such as, for example, the pressure or force applied to the member). Thus, a geometric construction modified by the term "substantially" includes such geometric properties within a suitable tolerance of the stated geometric construction (e.g., plus or minus 5%). For example, a "substantially linear" portion is a portion that defines an axis or center line that is within plus or minus 5% of being linear.

As used herein, the term "parallel" generally describes a relationship between two geometric constructions (e.g., two lines, two planes, a line and a plane or the like) in which the two geometric constructions are substantially non-intersecting as they extend substantially to infinity. For example, as used herein, a line is said to be parallel to another line when the lines do not intersect as they extend to infinity. Similarly, when a planar surface (i.e., a two-dimensional surface) is said to be parallel to a line, every point along the line is spaced apart from the nearest portion of the surface by a substantially equal distance. Two geometric constructions are described herein as being "parallel" or "substantially parallel" to each other when they are nominally parallel to each other, such as for example, when they are parallel to each other within a tolerance. Such tolerances can include, for example, manufacturing tolerances, measurement tolerances or the like.

As used herein, the terms "perpendicular" and "orthogonal" generally described a relationship between two geometric constructions (e.g., two lines, two planes, a line and a plane, or the like) in which the two geometric constructions are disposed at substantially 90°. For example, a line is said to be perpendicular to another line when the lines intersect at an angle substantially equal to 90°. Similarly, when a planar surface (e.g., a two dimensional surface) is said to be orthogonal to another planar surface, the planar surfaces are disposed at substantially 90° as the planar surfaces extend to infinity.

As used herein, the term "slope" generally describes a relationship between two geometric constructions in which the two geometric constructions are disposed at an angular orientation to each other. For example, an object's slope is related to an angle of a surface of the object relative to a neutral axis or plane. Furthermore, an object's slope is generally understood to be a change in height of the object along a given length of the neutral axis or plane. Thus, an object's slope forms an angle with the neutral axis referred to herein as "slope angle."

As used herein, the term "stiffness" is related to an object's resistance to deflection, deformation, and/or displacement that is produced by an applied force and is generally understood to be the opposite of the object's "flexibility." For example, a structure with greater stiffness is more resistant to deflection, deformation, and/or displacement when exposed to a force than a structure having a lower stiffness. Similarly stated, an object having a higher stiffness can be characterized as being more rigid than an object having a lower stiffness. Stiffness can be characterized in terms of the amount of force applied to the object and the resulting distance through which a first portion of the object deflects, deforms, and/or displaces with respect to a second portion of the object. When characterizing the stiffness of an object, the deflected distance may be measured as the deflection of a portion of the object different from the portion of the object to which the force is directly applied. Said another way, in some objects, the point of deflection is distinct from the point where force is applied.

Stiffness (and therefore, flexibility) is an extensive property of the object being described, and thus is dependent upon the material from which the object is formed as well as certain physical characteristics of the object (e.g., cross-sectional shape, length, boundary conditions, stress concentrations or discontinuities, etc.). For example, the stiffness of an object can be increased or decreased by selectively including in the object a material having a desired intensive (i.e., intrinsic) properties such as modulus of elasticity, Young's modulus, and/or hardness. The modulus of elasticity describes an object's tendency to elastically (i.e., non-permanently) deform in response to an applied force. A material having a high modulus of elasticity will not deflect as much as a material having a low modulus of elasticity in the presence of an equally applied stress. Young's modulus describes an object's tendency to elastically deform along an axis in response to a force applied along that axis. In other words, Young's modulus describes an object's elasticity (e.g., ability to resist permanent deformation) along an axis in response to a tensile or compressive force applied along that axis. Hardness describes an object's ability to resist localized plastic deformation (e.g., along a surface of the object) resulting from indentation or abrasion. Thus, the stiffness of the object can be decreased, for example, by introducing into the object and/or constructing the object of a material having a relatively low modulus of elasticity, Young's modulus, and/or hardness (among others).

The stiffness of an object can also be increased or decreased by changing a physical characteristic of the object, such as the shape or cross-sectional area of the object. For example, an object having a length and a cross-sectional area may have a greater stiffness than an object having an identical length but a smaller cross-sectional area. As another example, the stiffness of an object can be reduced by including one or more stress concentration risers (or discontinuous boundaries) that cause deformation to occur under a lower stress and/or at a particular location of the object. Thus, the stiffness of the object can be decreased by decreasing and/or changing the shape of the object.

Figure 2:
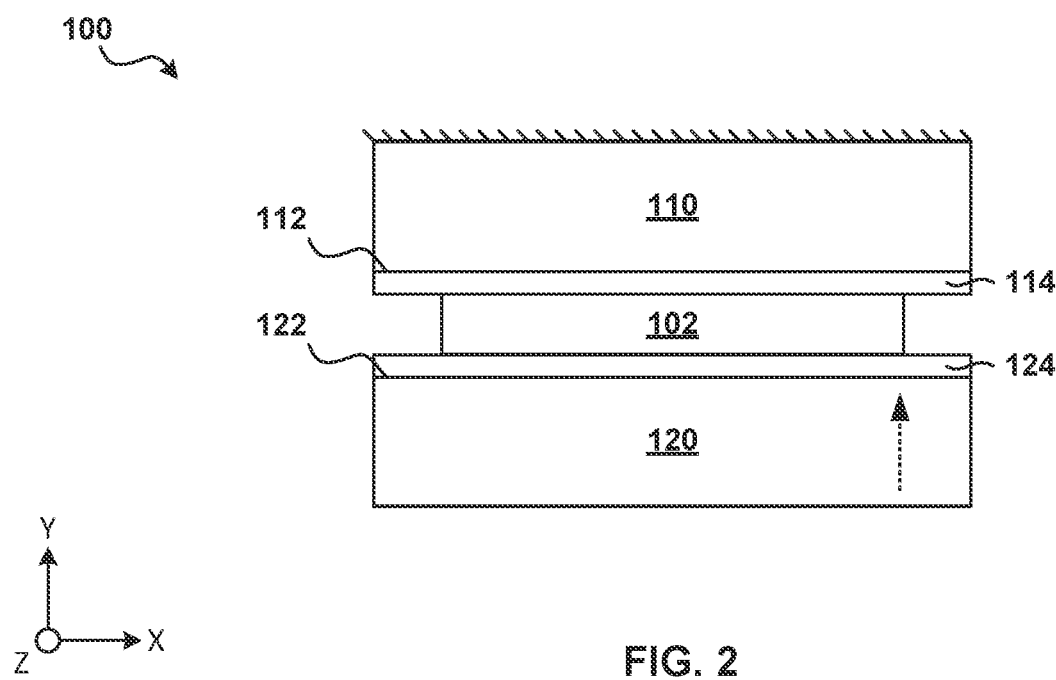

Referring now to the drawings, FIGS. 1 and 2 are schematic depictions of a mold assembly 100 used, for example, in a process of pressing a workpiece (e.g., workpiece 102) having one or more variations in thickness, according to an embodiment. As shown, mold assembly 100 includes a first mold 110, a second mold 120. The first mold 110 is coupled to and/or includes, a first liner 114, and the second mold 120 is coupled to and/or includes a second liner 124. While mold assembly 100 is shown as including four discrete components, other arrangements can be contemplated. For example, in other embodiments, instead of including at least four discrete components (e.g. 110, 114, 120, 124), the mold assembly 100 can include, for example, at least three discrete components (e.g., 110, 114, 120). In some embodiments, structures and/or functionalities of the various components of the mold assembly 100 can be combined into a single component. As an example, in some embodiments, the mold assembly 100 can include three discrete components, including the first mold 110, the second mold 120, and a unitary or single liner, bladder, or the like, as described in further detail herein with reference to specific embodiments. As another example, in some embodiments, mold assembly 100 can include two discrete components, including a unitary mold or a unibody mold ("unitary mold"), and a unitary liner. The mold assembly 100 can alternatively or otherwise include any suitable number and type of components (e.g., any number of molds, liners, and/or combinations thereof).

Mold assembly 100 can be or include any suitable type of mold, composite mold, mold assembly, and/or the like. For example, the mold assembly 100 can be a compression mold, a compression mold assembly, a direct pressure mold, a direct pressure mold assembly, and/or the like. Mold assembly 100 can include, for example, a 1-sided mold or a 2-sided mold. Mold assembly 100 can be configured to press, mold, form, and/or otherwise apply a load (e.g., a force or pressure) to a workpiece (e.g., the workpiece 102), such as a compression force exerted and/or produced by a press apparatus (not shown), as described herein with reference to FIG. 8. For example, mold assembly 100 can be configured to apply (e.g., with respect to workpiece 102) a load of 20 tons or more. As another example, mold assembly 100 can be configured to apply a load that can result in a pressure being exerted on a workpiece in a range between about 80 and 120 pounds per square inch (psi).

Workpiece 102 can be or include one or more layers, workpieces, and/or components, each of which has a thickness. In some embodiments, the workpiece 102 and/or one or more layers, workpieces, and/or components of the workpiece 102 can have a portion or region that has one or more variations in thickness. For example, workpiece 102 can be or include, for example, a skateboard deck and/or the like, which in turn, can be or can form a composite, laminate, or assembled blank, board, deck, and/or the like (collectively, "deck"). In some embodiments, such a deck can be suitable for street skateboarding, long boarding, downhill skateboarding or racing, and/or any other suitable purpose.

In some embodiments, workpiece 102 can be included in a set of workpieces, and the mold assembly 100 can be configured to press each of the workpieces included in the set of workpieces (e.g., one or more skateboard decks). In some embodiments, at least one of the skateboard decks can include, for example, two or more layers, plies, and/or the like (collectively, "layers"), such as described herein with reference to specific embodiments. For example, in some embodiments, the skateboard deck (e.g., the workpiece 102) can include two layers, three layers, four layers, five layers, six layers, seven layers, eight layers, nine layers, ten layers, eleven layers, twelve layers, or more. More particularly, in some embodiments, a skateboard deck can include, for example, seven or more layers (e.g., a 7-ply deck). In some embodiments, a skateboard deck (e.g., the workpiece 102) can include, for example, fewer than seven layers or more than seven layers. A skateboard deck can include layers formed from substantially the same material (e.g., a 7-ply maple wood deck) or can include two or more layers formed from different materials (e.g., one or more wood layers and one or more layers formed from a non-wood material).

In some embodiments, a skateboard deck can include layers, sublayers, or regions formed from a composite material. For example, the composite material can include a fiber reinforced material such as glass-reinforced or carbon-reinforced material. Glass-reinforced materials can be, for example, a glass-reinforced plastic, a glass-fiber reinforced plastic, a stitch-bonded fiberglass material, and/or the like. Carbon-reinforced materials can be, for example, a carbon fiber reinforced polymer, a carbon fiber reinforced plastic, a carbon fiber reinforced thermoplastic, a carbon fiber reinforced thermosetting-plastic, stitch-bonded carbon fiber material, and/or the like. As an example, a skateboard deck can be a reinforced skateboard deck, a mechanically-tuned skateboard deck, and the like. Moreover, such a skateboard deck can include one or more layers formed of a fiber reinforced material such as those described herein.

First mold 110 and/or second mold 120 can be or include a mold and/or parts of a mold or mold assembly. For example, first mold 110 and second mold 120 can be a pair of matching molds, a pair of complimentary molds, and/or the like. In this example, first mold 110 can be an upper mold, and second mold 120 can be a lower mold. As another example, first mold 110 and second mold 120 can be or can form a pair or halves of a composite mold or mold assembly. First mold 110 includes a first surface ("first surface 112"). Second mold 120 includes a second surface ("second surface 122"). First mold 110 and second mold 120 are spatially disposed or positioned at a desired distance relative to each other. For example, first mold 110 can be disposed above second mold 120 (e.g., spaced apart vertically or spaced apart in a direction along a y-axis, as shown in FIGS. 1 and 2). As another example, the first mold 110 can be positioned in spaced-apart relation with respect to second mold 120, such as in or along a direction oriented horizontally or in a direction oriented parallel to or along an x-axis or a z-axis (identified in FIGS. 1 and 2).

First surface 112 and/or second surface 122 can be or include complimentary pressing surfaces, molding surfaces, forming surfaces, and/or the like. First surface 112 and second surface 122 can be configured to collectively define or form a mold cavity configured to receive a workpiece (e.g., the workpiece 102). The first surface 112 and the second surface 122 can define the mold cavity having any suitable shape and/or geometry (e.g., based at least in part on a surface geometry of the first surface 112 and the second surface 122) for pressing the workpiece 102. For example, in some instances, the surface geometry of the first surface 112 and/or the second surface 122 can include one or more surface features such as a recess, pocket, concavity, depression, curve, arc, bump, ridge, protrusion, slope (e.g., sloped or inclined surface), and/or the like. In some embodiments, first surface 112 and/or second surface 122 can include a geometry such as that shown and described below with reference to FIG. 12.

First liner 114 and/or second liner 124 can be or include any suitable type of liner, such as a pressing liner, molding liner, forming liner, and/or the like (collectively, "liner"). First liner 114 and second liner 124 can be disposed adjacent to and/or can be at least temporarily coupled to first surface 112 and second surface 122, respectively, such as shown in FIGS. 1-2. In some implementations, the first liner 114 and/or second liner 124 can be configured to deform in response to an applied load exceeding a predetermined threshold. For example, first liner 114 and/or second liner 124 can be, can form, and/or can include a compliant liner, a deformable liner, an elastic liner, and/or the like. In some embodiments, first liner 114 and/or second liner 124 can include or be formed from a material having a predetermined characteristic or material property (e.g., compressive strength, stiffness, rigidity, hardness, Young's modulus, etc.) such that deformation of first liner 114 and/or second liner 124 (e.g. about or against the workpiece 102) is caused by or responsive to an applied load or pressure exceeding a predetermined threshold. As another example, first liner 114 and/or second liner 124 can be formed from a material having a compressive strength less than that of a material from which first surface 112 and/or second surface 122 are formed. As another example, first liner 114 and/or second liner 124 can be formed from a material having a compressive strength less than that of workpiece 102. In some embodiments, first liner 114 and/or second liner 124 can be formed from a relative soft, flexible, and/or elastic material such as a polymer material, a visco-elastic material, and/or the like, including, for example, polyurethane, silicone, and/or the like. In some embodiments, first liner 114 and second liner 124 can be formed from a cast, unitary liner, such as described herein with reference to FIG. 11.

In some embodiments, first mold 110 and/or second mold 120 can be, for example, mounted to a frame (not shown) of a press apparatus (not shown), such as described with reference to FIG. 8. In some embodiments, the press apparatus can include an actuator (not shown), including, for example, one or more pneumatically driven pumps or jacks, one or more hydraulically driven pumps or jacks, and/or any suitable combination thereof. For example, the actuator can include an air-powered hydraulic bottle jack. In some embodiments, the actuator can include, for example, a hose or tube, such as a hydraulic hose, a pneumatic hose, and the like. The actuator can otherwise include any suitable type of jack, lift, and/or the like. The actuator can be configured to drive or cause movement of first mold 110 and/or second mold 120, such as in a direction oriented parallel with the Y-axis, as shown in FIGS. 1-2. For example, in some implementations, the first mold 110 can be mounted to a fixed surface (e.g. of the frame) and second mold 120 can be mounted to a movable surface (e.g., of or interconnected to the frame), or vice versa. During pressing (e.g., of the workpiece 102) first mold 110 and second mold 120 can be configured to and/or can otherwise be caused to move toward or away from each other in response to actuation of the press apparatus via the actuator, such as shown in FIGS. 1-2. In some embodiments, the movable mold (e.g., the first mold 110 and/or the second mold 120) can include, for example, a surface of a mount, base mount, mold base, platform, stage, or the like (collectively, "mold base").

In some embodiments, mold assembly 100 can be configured to heat workpiece 102 (e.g., before, during, and/or after pressing). For example, first mold 110 and/or second mold 120 can include a heat transfer device (not shown) configured to transfer heat to workpiece 102. In some embodiments, the heat transfer device can be configured to transfer heat to workpiece 102 and/or transfer heat from workpiece 102. For example, the heat transfer device can be configured to transfer heat to workpiece 102 such as to speed a curing time of (e.g., epoxy resin in) workpiece 102. In this example, the heat transfer device can additionally or alternatively be configured to transfer heat from workpiece 102 to cool or otherwise quench (e.g., after curing) workpiece 102. The heat transfer device can be disposed in, about, or adjacent to, for example, first mold 110 and/or second mold 120 (e.g., adjacent to first surface 112 or second surface 122), such as described with reference to FIGS. 8-9.

In use, mold assembly 100 can be implemented in a manufacturing process of pressing a workpiece (e.g., workpiece 102) via a pressing apparatus and/or the like, such as shown in FIGS. 1-2. As described above, in some implementations, the workpiece 102 can be a skateboard deck and/or any other suitable workpiece. In some instances, prior to disposing the workpiece 102 in the pressing apparatus, the workpiece 102 can be prepared and assembled such as described herein with reference to FIG. 4. In other embodiments, the workpiece 102 can otherwise be prepared and assembled in any suitable manner.

The manufacturing process can include, for example, disposing the workpiece 102 in an apparatus (e.g., a pressing apparatus), including mold assembly 100. More specifically, disposing the workpiece 102 in the apparatus can include placing, laying, or positioning the workpiece 102 in the mold cavity (e.g., collectively defined by first surface 112 and second surface 122). In some instances, the workpiece 102 can be placed in the mold cavity such that the workpiece is between first mold 110 and second mold 120 (e.g., below first surface 112 and first liner 114, and above second surface 122 and second liner 124), as shown in FIG. 1. In some embodiments, workpiece 102 can be disposed in mold assembly 100 in an upside-down orientation or attitude (e.g., placed upside-down on second mold 120). By way of example, a top surface of a workpiece that will become a skateboard deck can be placed on, in contact with, and/or adjacent to the second surface 122 or second liner 124.

Once the workpiece 102 is placed in a desired position within the mold cavity, the manufacturing process can include, for example, pressing the workpiece 102 by actuating the apparatus to subject the workpiece 102 to an applied load or pressure via mold assembly 100, as shown in FIG. 2. For example, pressing the workpiece 102 can include driving or otherwise causing movement of second mold 120 toward first mold 110 (or vice versa) to close mold assembly 100 and/or otherwise reduce a distance between the first surface 112 or first liner 114 and the second surface 122 or second liner 124. In some embodiments, pressing the workpiece 102 can include driving or otherwise causing movement of first mold 110 toward second mold 120. In some embodiments, pressing the workpiece 102 can include driving or otherwise causing movement of first mold 110 and second mold 120 toward each other. Second mold 120 and/or first mold 110 can be driven to move, for example, in a direction substantially parallel with the Y-axis, such as shown in FIGS. 1-2. In some embodiments, pressing the workpiece 102 can include pressing for a sufficient time to allow curing and/or at least partial curing of an adhesive or the like used to bond elements or portions of the workpiece 102 (e.g., bond layers of a skateboard deck).

The manufacturing process can further include, for example, applying the load or pressure via mold assembly 100 when the workpiece 102 is disposed in the mold cavity, as shown in FIG. 2. For example, applying the load or pressure can include compressing the workpiece 102 with a substantially uniform pressure. In some embodiments, at least one of first liner 114 or second liner 124 can be configured to deform in response to the applied load and/or a portion of the applied load on a region thereof, which in turn, can result in the workpiece 102 being compressed with a substantially uniform pressure. For example, at least one of first liner 114 or second liner 124 can be configured to deform in response to the applied load, a portion of the applied load, and/or a pressure on a region exceeding a predetermined threshold.

As another example, at least one of first liner 114 or second liner 124 can include, for example, a recess, notch, detent, curvature, protrusion, etc. configured to receive a part of the workpiece 102 when the workpiece 102 is disposed in the mold cavity. In some such embodiments, at least one of first liner 114 or second liner 124 can be configured to deform in response to the applied load and/or a portion of the applied load on a region thereof. In some embodiments, at least one of first liner 114 or second liner 124 can be configured to deform in response to the applied load and/or a portion of the applied load on a region thereof exceeding a predetermined threshold.

In some embodiments, the manufacturing process can further include, for example, curing workpiece 102. In some embodiments, the curing can be performed in situ (e.g., in mold assembly 100) while the workpiece 102 is being compressed. In some embodiments, the curing can include a duration of about 30 to 45 minutes. In some embodiments, the curing can include a duration of about 10 to 60 minutes. In some embodiments, the workpiece 102 (e.g., a skateboard deck) can be partially cured within the mold assembly 100 and then removed from the mold assembly 100 and allowed to complete the curing process (e.g., outside of the mold assembly 100). After applying the load for the predetermined and/or desired interval, first mold 110 and second mold 120 can be separated for removal of the workpiece 102 from the mold cavity.

Figure 3:
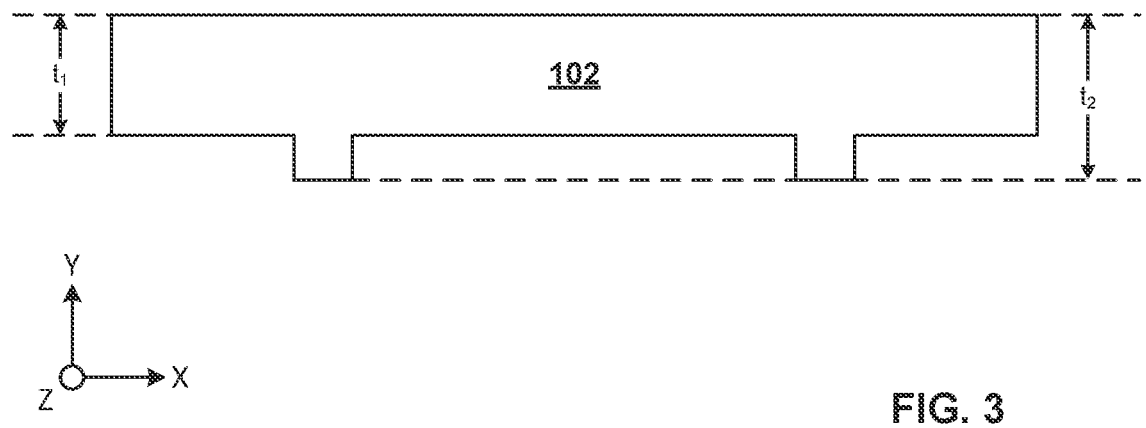
FIG. 3 is a schematic depiction of the workpiece shown in FIGS. 1-2.

FIG. 3 is a schematic depiction of the workpiece (workpiece 102) shown in FIGS. 1-2, according to an embodiment. As shown, in some instances, workpiece 102 can include a variation in thickness. For example, workpiece 102 includes a first thickness $t_1$ and a second thickness $t_2$ (measured along the Y-axis). While workpiece 102 is shown as including variations in thickness of a particular geometry, shape, size, etc., the variations in thickness can otherwise be of any geometry, shape, size, etc. Moreover, while workpiece 102 is shown as including two discrete variations in thickness, workpiece 102 can otherwise include any number of variations in thickness, discrete or otherwise.

In some embodiments, the workpiece 102 can include variations in thickness as a result of one or more layers or portions of a layer included in the workpiece 102. For example, in some implementations, the workpiece 102 can be formed from and/or can otherwise include any suitable number of layers, plies, components, elements, etc. (as described above). In some instances, the layers can have substantially the same geometry, shape, and/or perimeter (e.g., substantially the same dimensions in along the X-axis and Z-axis and with the same or different thicknesses along the Y-axis). In other instances, one or more layers can have a geometry, shape, and/or perimeter (e.g., along the X-axis and/or Z-axis) that is different from a geometry, shape, and/or perimeter of at least one other layer. In some instances, the workpiece 102 can include, for example, one or more partial layers disposed in a desired position(s) along the workpiece 102. In such instances, the one or more partial layers of the workpiece 102 can be used to modify one or more characteristics of the workpiece 102 at or near an area or region corresponding to the partial layer(s), as described in further detail herein.

Figure 4:
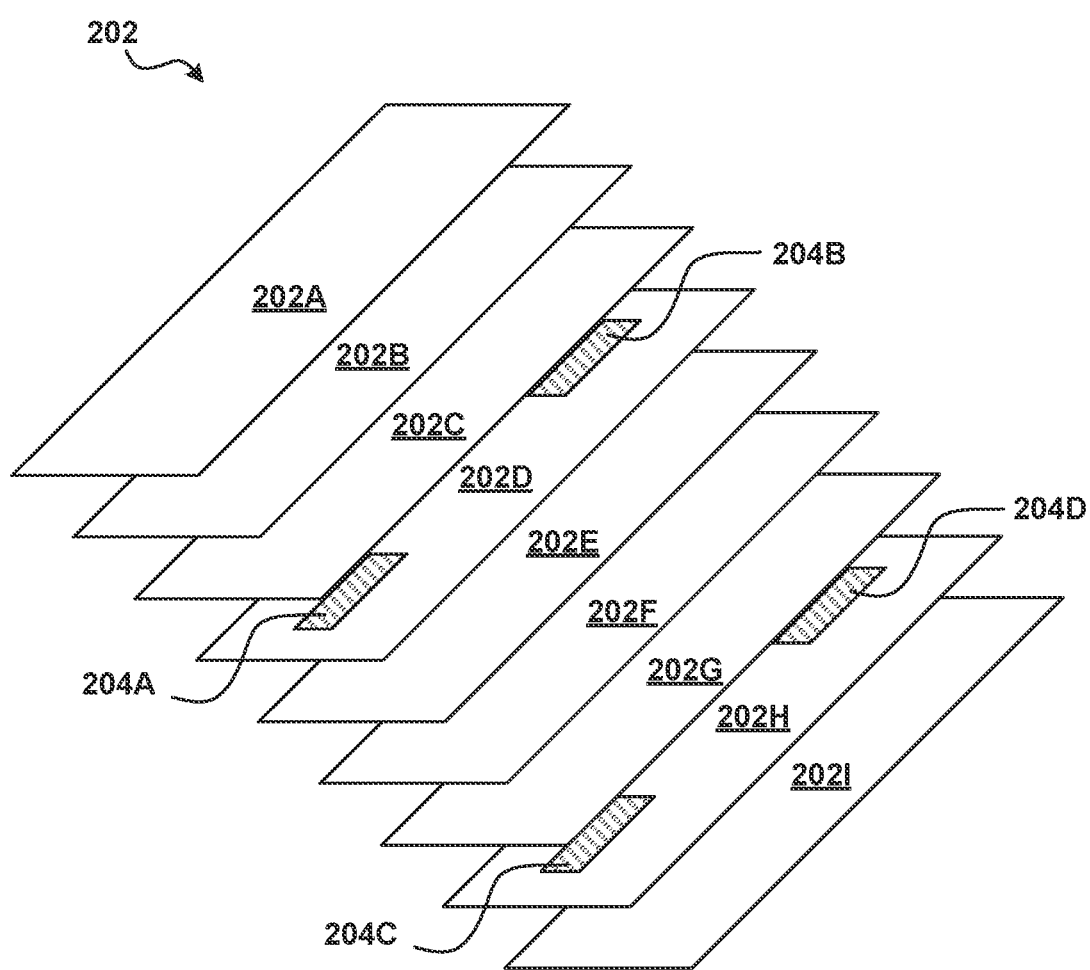
FIG. 4 is an exploded, schematic depiction of a skateboard deck before pressing, according to an embodiment.
Figure 5:
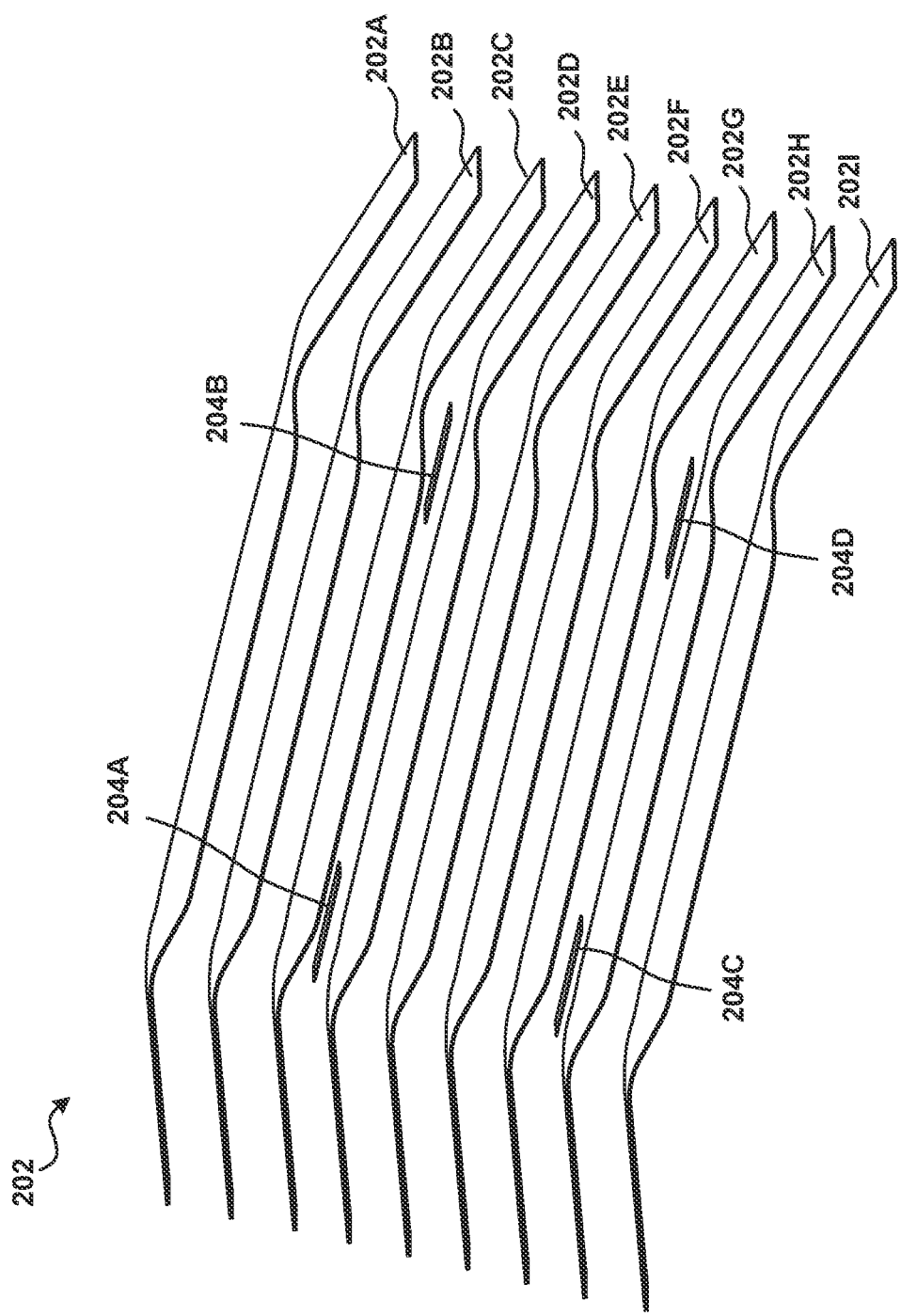
FIG. 5 is an exploded, schematic depiction of a skateboard deck after pressing, according to an embodiment.
Figure 6:
FIGS. 6 and 7 are a top view depiction and a side view depiction, respectively, of a skateboard deck after pressing, according to an embodiment.
Figure 7:

FIGS. 4-7 are various views of a workpiece 202 having at least one variation in thickness, according to an embodiment. FIGS. 4 and 5 are exploded, schematic depictions of the workpiece 202 before pressing and after pressing, respectively. FIGS. 6 and 7 are a top view and a side view, respectively, of the workpiece 200 after pressing and shaping into a desired shape. As described above, the workpiece 202 can be, for example, a skateboard deck (e.g., a deck for street skateboarding). The workpiece 202 (referred to herein as "deck 202") can include any number of layers formed of or from any suitable material, materials, or combinations thereof.

As shown in FIG. 4, the deck 202 includes layers 202A-202I and reinforcement patches 204A-204D (collectively, "patches 204A-204D" or "reinforcement patches 204A-204D" or "anti-break patches 204A-204D"). Layer 202A can be, for example, a first release layer (e.g., a bottom release layer). In some embodiments, the first release layer can be formed from any suitable material such as, for example, a polymer such as a high-density polyethylene (HDPE) resin sheet, and/or the like. In some embodiments, the HDPE resin or other suitable polymer sheet can have a thickness in the range of about 0.005 inches to about 0.062 inches. In some embodiments, the HDPE resin or other suitable polymer sheet (e.g., layer 202A) can be, for example, a temporary layer used to build or assemble the deck 202. For example, in some embodiments, the HDPE resin sheet (e.g., layer 202A) can be a layer configured to at least temporarily retain the deck 202 during assembly and to protect one or more other layers (e.g., layer 202B) during pressing. In other embodiments, the HDPE resin sheet (e.g., layer 202A) can be a layer of the pressed or formed deck 202.

Layer 202B can be, for example, a first ply layer or the like (e.g., a bottom ply layer). In some embodiments, the first ply layer can be, for example, a wood ply layer or wood veneer. In some embodiments, the wood ply layer or wood veneer can be, for example, a maple veneer, a face-grade maple veneer, and/or the like. In some embodiments, the wood ply layer or wood veneer (e.g., layer 202B) can have a thickness of about 0.062 inches. In some embodiments, the layer 202B is a bottom, outer layer of the skateboard deck 202.

Layer 202C can include, for example, a first composite layer (e.g., a bottom composite layer). In some embodiments, the first composite layer can include, for example, a composite material such as glass-reinforced plastic, a glass-fiber reinforced plastic, a stitch-bonded fiberglass layer, carbon-fiber reinforced plastic, and/or the like ("composite layer"). In some embodiments, the first composite layer (e.g., layer 202C) can be and/or can include, for example, a biaxial stitch-bonded fiberglass layer (e.g., with fibers oriented in orthogonal directions such as 0° fibers and 90° fibers). In some embodiments, the first composite layer can include a biaxial stitch-bonded fiberglass layer having a density (e.g., surface density) of about 350 grams per square meter ($g/m^2$).

Each of the layers 202D-202G can be, for example, a core layer. In some embodiments, the core layer(s) can be, for example, a wood core ply, such as a maple core ply, and/or the like. In some embodiments, each core layer (each layer 202D-202G) can have a thickness of about 0.05 inches.

Layer 202H can be, for example, a second composite layer (e.g., a top composite layer). In some embodiments, the second composite layer can be, for example, similar to the first composite layer (e.g., layer 202C). In other embodiments, the second composite layer can be and/or can include any suitable composite material such as those described herein. For example, the second composite layer (e.g., layer 202H) can be or can be formed of a stitch-bonded fiberglass material, and/or the like. In some embodiments, the second composite layer can be and/or can include, for example, a triaxial stitch-bonded fiberglass layer (e.g., with fibers oriented along three axes such as 0° fibers and ±45° fibers. In some embodiments, the second composite layer (e.g., layer 202H) can include a triaxial stitch-bonded fiberglass layer having a density (e.g., surface density) of about 500 grams per square meter ($g/m^2$).

Layer 202I can be, for example, a second release layer (e.g., a top release layer or a top build/release layer). In some embodiments, the second release layer can be formed from any suitable material such as, for example, a polymer sheet such as a HDPE resin sheet, and/or the like. In some embodiments, the second release layer (e.g., layer 202I) can be substantially similar to the first release layer (e.g., layer 202A). In some embodiments, the HDPE resin sheet or other suitable polymer can have a thickness of about 0.062 inches. As described above with reference to the layer 202A, in some embodiments, the layer 202I can be, for example, a temporary layer used to build or assemble the deck 202. For example, in some embodiments, the HDPE resin sheet (e.g., layer 202I) can be a layer configured to at least temporarily retain the deck 202 during assembly and to protect one or more other layers (e.g., layer 202H) during pressing. In other embodiments, the HDPE resin sheet (e.g., layer 202I) can be a layer of the pressed or formed deck 202.

Each of the patches 204A-204D can be and/or can form, for example, a reinforcement patch, layer, region, etc. (e.g., an anti-break patch, an anti-break layer, and/or the like). In some embodiments, the patches 204A-204D can be formed from a composite material that is substantially similar to the composite material described above with reference to layers 202C and/or 202H. In some embodiments, the patches 204A-204D can be, for example, stitch-bonded fiberglass patches, and/or the like. In some embodiments, the patches 204A-204D can be, for example, triaxial (e.g. 0°±45°) stitch-bonded fiberglass patches. In some embodiments, the patches 204A-204D can formed from and/or can include a triaxial stitch-bonded fiberglass material having a density (e.g. surface density) of about 500 g/m².

In some embodiments, the stitch-bonded fiberglass layers (e.g., layer 202C and layer 202H) and/or patches (e.g. patches 204A-204D) can include and/or can be formed of or from, for example, a stitch-bonded non-crimp E-fiberglass cloth, or the like. In some embodiments, the stitch-bonded fiberglass layers (e.g., layer 202C and layer 202H) and/or patches (e.g., patches 204A-204D) can include and/or can be formed of or from, for example, E7 stitch-bonded non-crimp fiberglass cloth. In other embodiments, the stitch-bonded fiberglass layers (e.g., layer 202C and layer 202H) and/or patches (e.g., patches 204A-204D) otherwise can be and/or can include any suitable type and/or amount of fiberglass material, such as E-glass, S-glass, E7-glass, and/or the like.

In some embodiments, the layers 202A-202I—or, in embodiments in which layers 202A and 202I are temporarily layers, layers 202B-202H—and the patches 204A-204D can be bonded using any suitable bonding material such as, for example, adhesive, glue, epoxy, resin, and/or the like. In some embodiments, the bonding material can be and/or can include, for example, a blended epoxy composed of 20% urethane and a 5% adhesion promoter. In some embodiments, the bonding material can be and/or can include, for example, a 2-part epoxy (e.g., epoxy resin) configured to cure at room-temperature. In some embodiments, the bonding material can be blended at and/or upon use. In some embodiments, the bonding material can be cured, at least in part, by exposure to thermal energy (e.g., heat). In some such embodiments, a viscosity of the bonding material may be lowered when exposed to heat, which in turn, can incorporate wood fibers of at least some of the layers (e.g., via the matrix material) therein and/or can otherwise facilitate bonding of the layers 202A-202I (or layers 202B-202H when the layers 202A and 202I are temporary layers).

In some embodiments, prior to disposing the deck 202 in a pressing apparatus, such as that described with reference to FIGS. 1-2, the deck 202 can be prepared and at least partially assembled to include at least a portion of the layers 202A-202I and patches 204A-204D. For example, in some instances, layer 202I (e.g., the layer formed by the HDPE resin sheet) can be a layer on which the deck 202 is at least partially assembled and transferred to the press for pressing and curing. In some instances, a manufacturing process can include placing the layer 202B on top layer 202I and a desired amount of bonding material (e.g., epoxy resin or the like) is metered and applied to what will be an inside surface of layer 202B. The bonding material can be distributed on or along the surface of layer 202B (e.g., automatically, mechanically, and/or via human intervention with a squeegee or the like). Layer 202B can then be removed from layer 202I and set aside to at least partially cure. In some instances, setting aside the layer 202B can include laying, placing, and/or disposing layer 202B on layer 202A. In other instances, layer 202A can be applied at a later step in the manufacturing process, as described in further detail herein.

In some instances, Layer 202G (e.g., a wood core layer) can then be laid, disposed, and/or placed on or adjacent to layer 202I. Layer 202G has marked locations (e.g., "target location(s)") associated with and/or corresponding to desired locations for the patches 204C-204D. In some embodiments, the target location(s) can include, for example, a region of the deck 202 at which skateboard trucks will be mounted to the deck 202 (after pressing). Next, patches 204C and 204D are placed on layer 202G within a corresponding target location so that when the skateboard deck shape is cut out the patches 204C and 204D will be under the trucks that will be mounted thereto, which can reinforce the deck beyond a simple single layer of composite material. Layer 202H (e.g., the second composite layer) is then placed over patches 204C and 204D trapping them down to the layer 202G (e.g., the wood core layer) and a desired amount of bonding material (e.g., a desired amount of epoxy resin, based on, for example, glass weight of the composite layer (e.g., layer 202H). The desired resin content by weight is metered and applied to the layer 202H. The resin can then be distributed on or along the surface of layer 202H (e.g., automatically, mechanically, and/or via human intervention with a squeegee or the like). Layers 202G-202I and the patches 204C and 204D are then flipped over and resin is applied to layer 202G.

Once flipped, the layer 202F (e.g., a wood core layer) is laid, disposed, and/or placed on or adjacent to layer 202G and a desired amount of resin is applied to layer 202F. The layers 202E and 202D (e.g., wood core layers) are similarly assembled. After placing layer 202D and applying the desired amount of resin, the patches 204A and 204B are placed on layer 202D (e.g., in a manner similar to that of the placement of patches 204C and 204D on layer 202H). The layer 202C (e.g., the first composite layer) can then be laid, disposed, and/or placed on or adjacent to the layer 202D, which in turn, can trap the patches 204A and 204B between the layers 202C and 202D. Bonding material (e.g., epoxy resin) is then applied and spread or distributed about or along layer 202C. Next, layer 202B (e.g., the wood ply or veneer layer) is placed on top of the first composite layer (e.g., layer 202C), which has been wetted and/or covered with the epoxy resin. In some instances, layer 202A can be at least temporarily coupled to layer 202B when layer 202B is placed on layer 202C. In other instances, layer 202A can be positioned on layer 202B after layer 202B is placed on layer 202C. In some instances, one or more decks 202 can be prepared in a substantially similar manner as described above and pressed via the same or two or more parallel processes.

FIG. 5 illustrates the deck 202 after being pressed. In some instances, the deck 202 can be pressed into any suitable shape such as, for example, a shape suitable for street skateboarding. In some implementations, the deck 202 can be shaped after pressing, as shown in FIGS. 6 and 7.

Advantageously, the use of the wood (e.g., maple) veneer in layer 202B for the bottom ply layer serves to protect the composite layers (e.g., layer 202C and 202H and patches 204A-204D) and the deck 202 overall from damage, such as may occur as a result of performing an act of skateboarding (e.g., sliding on a rail or beam ("rail sliding"), and/or the like). Moreover, the use of (i) the biaxial stitch-bonded fiberglass material in layer 202C for the first composite layer (e.g., the bottom composite layer), (ii) the triaxial stitch-bonded fiberglass material in layer 202H for the second composite layer (e.g., the top composite layer), and (iii) the triaxial stitch-bonded fiberglass material in patches 204A-204D, can facilitate (1) a reduction in the overall mass of the deck 202, (2) a maintaining of a desired curvature (e.g., a concave curvature) of the deck 202, (3) a maintaining of a desired stiffness, rigidity, and/or "pop" of the deck 202, and (4) a reduction of undesirable stress distribution(s) (e.g., "twist" of the deck 202 resulting from internal stress distribution).

In particular, the materials and positions of layer 202C, patches 204A-204D, and layer 202H provides two layers of fibers in a direction of and/or along a long or longitudinal axis of the assembled deck 202, one layer of fibers across the bottom of the deck 202 in a direction of and/or along a short or lateral axis to hold the concave shape of the deck 202, and then two layers of fibers at ±45° on a top portion of the deck 202 to counter twist. Moreover, the materials and positions of layer 202C, patches 204A-204D, and layer 202H in the deck 202 can, in some instances, eliminate the need for wood layers used as cross-plies (e.g., as is required in traditional 7-ply decks). In some implementations, the materials and positions of layer 202C, patches 204A-204D, and layer 202H in the deck 202 can increase a strength of the deck 202 (e.g., particularly at mounting positions for the trucks of the skateboard, which can experience increased stress during use). In some implementations, covering the patches 204A-204D by corresponding composite layers 202D and 202H can limit and/or substantially prevent the deck 202 from breaking during use as a result of one or more of the patches 204A-204D simply "popping" off when a stress would otherwise exceed a strength of a wood layer and/or a strength of a bond between the patches 204-204D and an outer layer of the deck 202. In other words, the arrangement of the layers 202D and 202H and the patches 204A-204D can be such that the composite layers 202D and 202H distribute a stress throughout substantially the entire deck that can reduce a likelihood of the deck 202 breaking in response to an applied force (e.g., during use).

FIGS. 6-7 are schematic depictions of the workpiece 202 after pressing, curing, and shaping, including a top view and a side view, respectively. In this embodiment, the workpiece 202 has been pressed, cured, and shaped into a skateboard deck suitable for street skateboarding. In other embodiments, the workpiece 202 can be pressed, cured, and shaped into a skateboard suitable for any desired purpose. The workpiece 202 (e.g., deck) includes the patches 204A-204D in desired positions along the deck, where the trucks of the skateboard are configured to be coupled, as shown in FIG. 6. Although particularly shown in FIG. 6, the workpiece can include patches 204A-204D disposed in any suitable manner. Moreover, the workpiece (e.g., deck) can include fewer than the four patches 204A-204D or more than the four patches 204A-204D, and/or can include patches having any suitable shape or configuration. For example, in some embodiments, a workpiece or deck can include patches having any suitable polygonal, elliptical, round, and/or irregular shape. As another example, while the patches 204A and 204C are shown in FIG. 6 as being separate from patches 204B and 204D, respectively, in other embodiments, a patch can include a portion extending between and/or otherwise connecting end portions of the patch.

While the workpiece 202 is particularly shown in FIGS. 4-7 and described above as including, for example, seven layers forming a skateboard deck, it should be understood that the workpiece has been presented by way of example only and not limitation. The embodiments and/or methods described herein can be used to press a workpiece having any number of layers. Moreover, while the layers of the workpiece 202 are described above as being arranged in a particular order, the embodiments and/or methods described herein can be used to press a workpiece having any suitable arrangement of layers.

Figure 8:
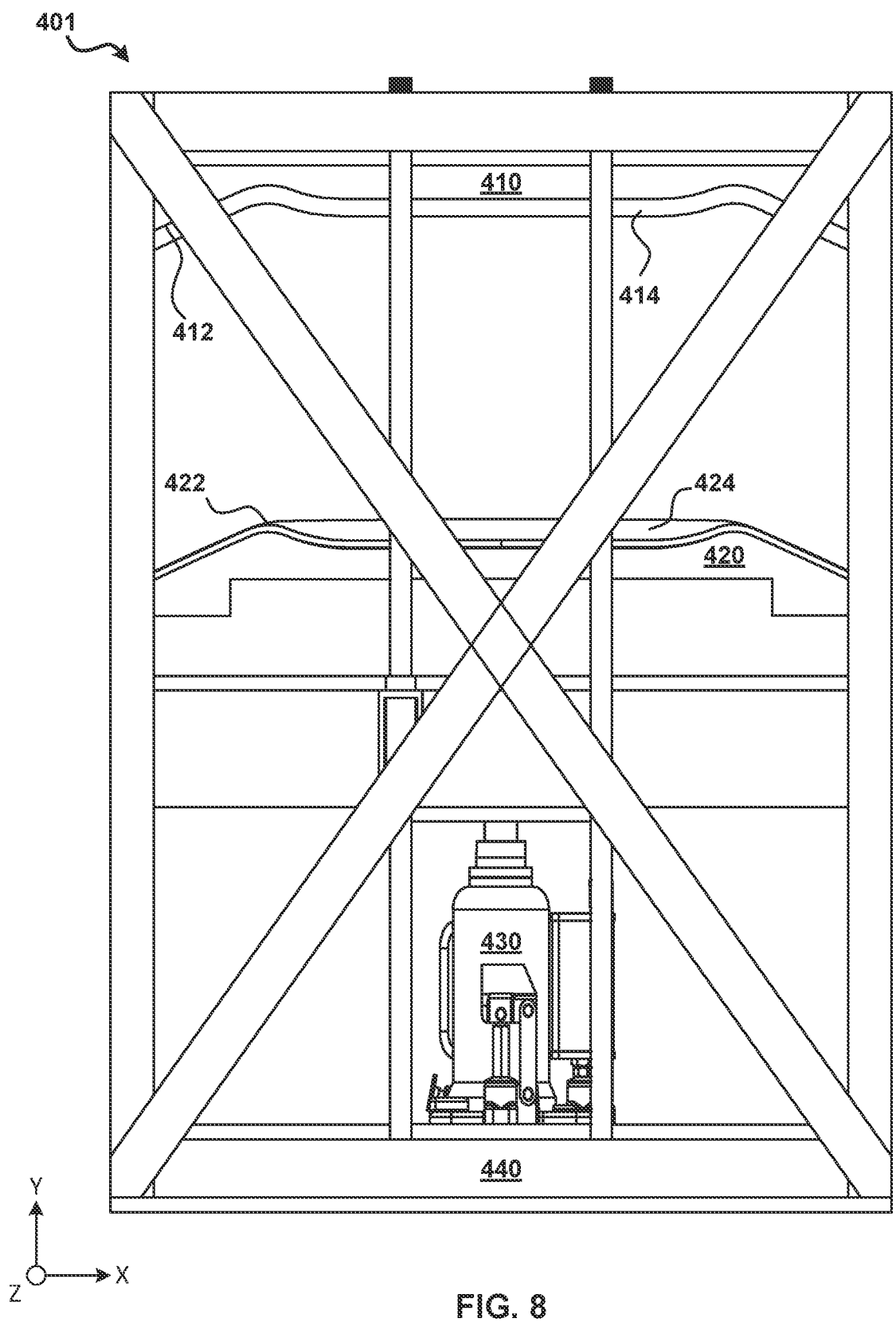
FIG. 8 is a side view depiction of a press assembly, according to an embodiment.
Figure 9:
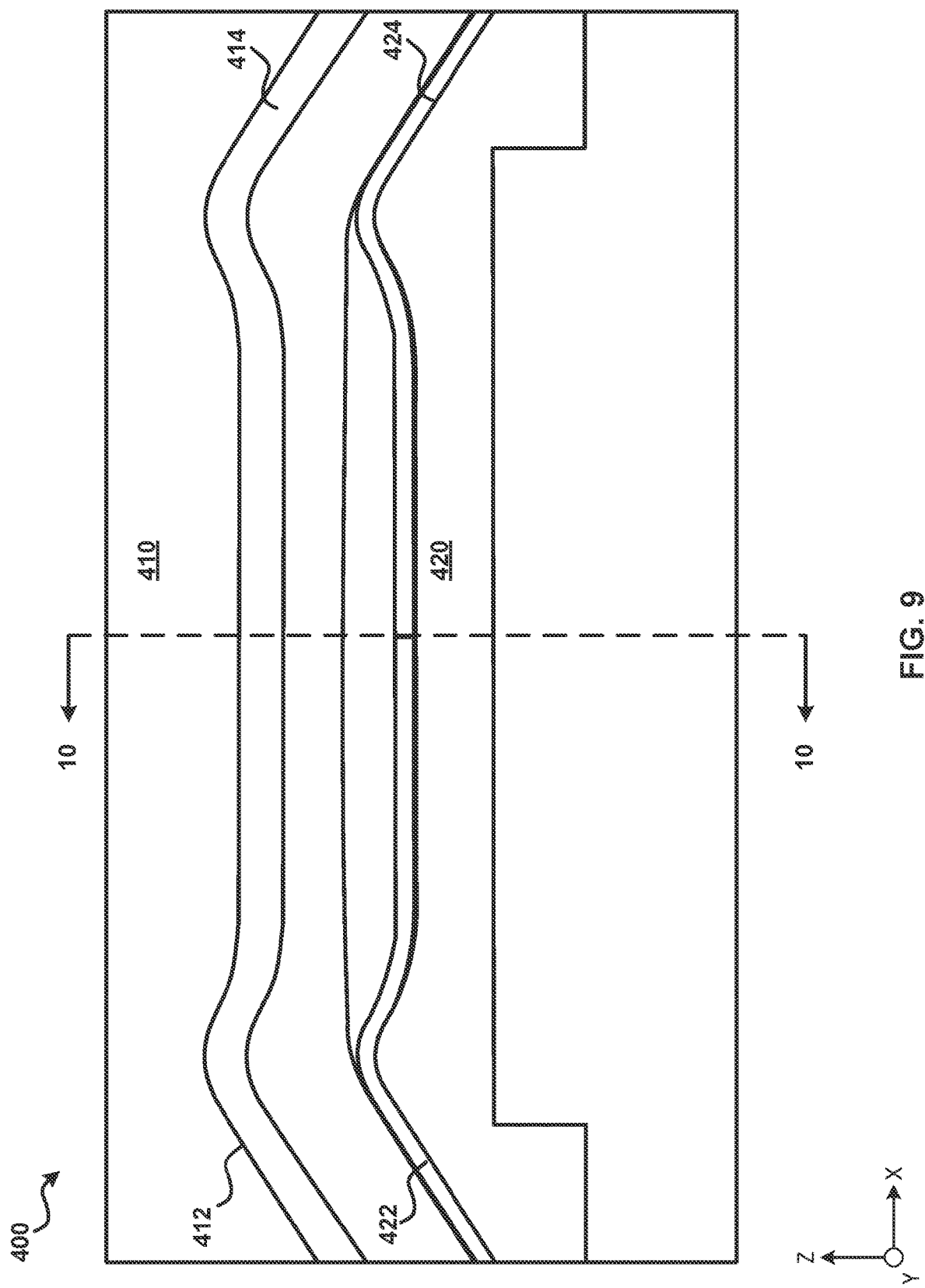
FIG. 9 is a side view depiction of a mold assembly included in the press depicted in FIG. 7.
Figure 10:
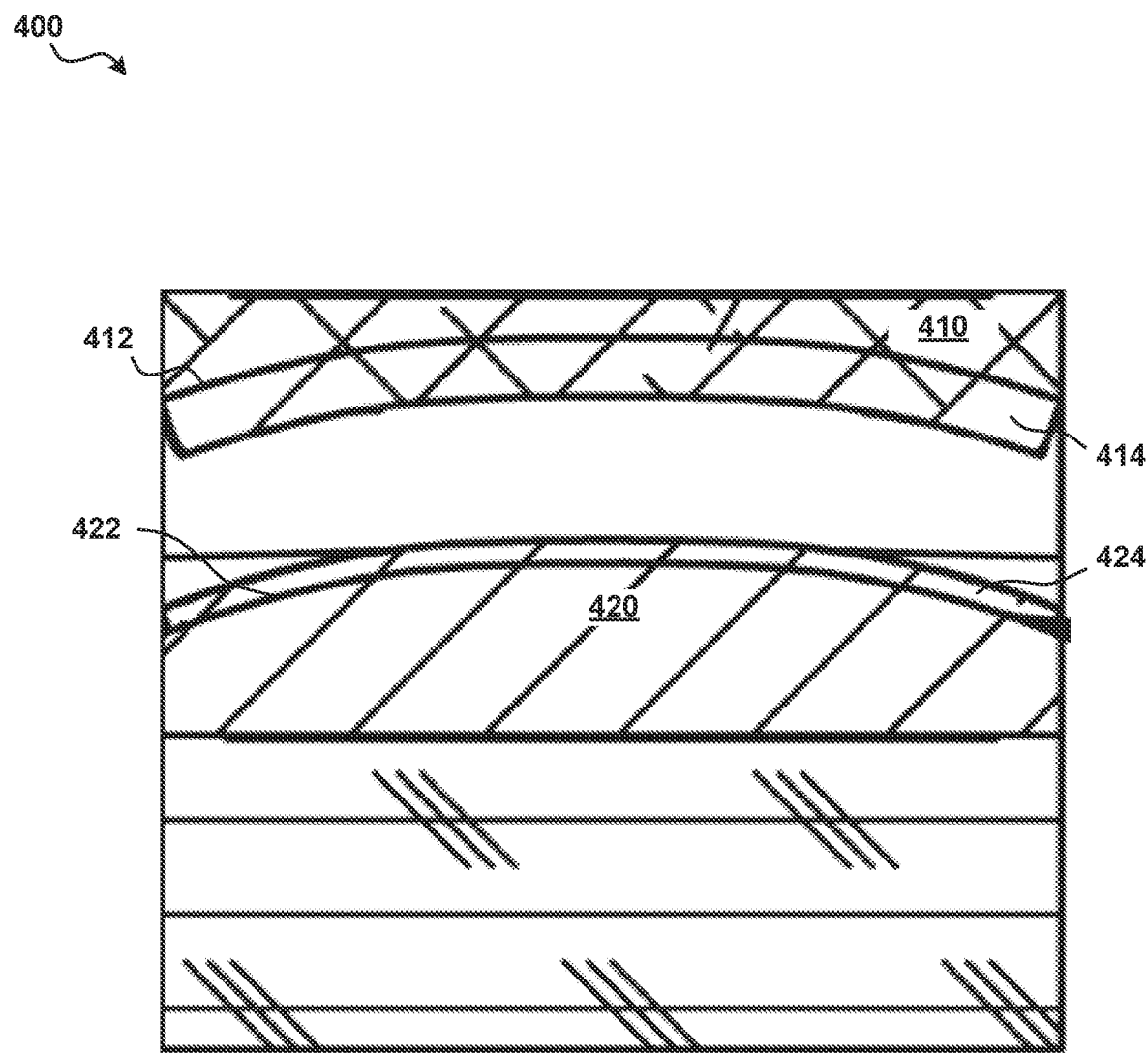
FIG. 10 is a cross-sectional view of the mold assembly depicted in FIG. 9, taken along the line 10-10.

FIG. 8 is a schematic depiction of a press apparatus 401 including a mold assembly 400, according to an embodiment. FIGS. 9-10 are schematic depictions of the mold assembly 400 depicted in FIG. 8, including a front view and a cross-sectional view, respectively, according to an embodiment. Press apparatus 401 can be structurally and/or functionally similar to the press apparatus, described herein with reference to FIGS. 1-2. Moreover, mold assembly 400 can be structurally and/or functionally similar to any mold assembly, as described herein (e.g. mold assembly 100). As shown, press apparatus 401 can include mold assembly 400, including a first mold 410, a second mold 420, a first liner 414, and a second liner 424, and further, a frame, and an actuator.

Actuator 430 can be or can include any suitable type of actuator, such as any of those described herein. For example, actuator 430 can be or can include a pneumatically driven (e.g., air-driven) and/or hydraulically driven (e.g., liquid-driven) pump or jack. In some embodiments, for example, the actuator 430 can be an air-powered hydraulic bottle jack, and/or the like. Actuator 430 can be configured to actuate press apparatus 401 for pressing a workpiece having one or more variations in thickness (e.g., as described above with reference to the workpieces 102 and/or 202). In some embodiments, actuator 430 can include one or more cylinders or jacks configured to move one or more portions of the mold assembly 400, as described in further detail herein. Frame 440 can be or can include any suitable type of frame or structure, such as a vertical frame, a multi-bay frame (e.g., 6-bay frame), and/or the like.

In some embodiments, press apparatus 401 can include, for example, a pneumatic, urethane-bladder press, or the like. In some embodiments, press apparatus 401 can include, for example, a heated press. For example, in some embodiments, first mold 410 and/or second mold 420 can include a heat transfer device (not shown) configured to transfer heat to a workpiece (e.g., the workpieces 102 and/or 202). The heat transfer device can be disposed in, about, or adjacent to, for example, first mold 410 and/or second mold 420 (e.g., adjacent to a first surface 412 or a second surface 422 thereof). The heat transfer device can include any suitable type of heat transfer device that can be configured to facilitate curing of a bonding material, adhesive, glue, and/or the like (e.g., epoxy resin, as described above).

In some embodiments, press apparatus 401 can be configured to apply (e.g., via mold assembly 400 and the actuator 430) a load in the range of about 20 to 40 tons. In some embodiments, press apparatus 401 can be configured to apply (e.g., via mold assembly 400 and actuator 430) a load configured to exert a pressure on a workpiece in the range of about 80-120 psi. In some embodiments, press apparatus 401 can be configured to apply the load via mold assembly 400 and the actuator 430 that can, for example, compress a workpiece (e.g., the workpieces 102 and/or 202)

with a substantially uniform pressure. In some embodiments, press apparatus 401 can be implemented in conjunction with one or more additional presses (e.g., similar or substantially identical to press apparatus 401). For example, in some embodiments, press apparatus 401 can be implemented in conjunction with five additional presses, or more. In some such embodiments, the presses or the set of presses can include one or more common structures such as a common frame (or portions thereof), a common actuator or set of actuators that work as a single unit, a common mold assembly (or portions thereof), and/or the like. Advantageously, such a configuration can reduce a footprint of the associated installation (e.g., set of press apparatus) and can increase throughput.

In some embodiments, press apparatus 401 can be configured as, for example, a one-sided press, a two-sided press, and/or the like. For example, press apparatus 401 can be configured to press a workpiece (e.g., the workpieces 102 and/or 202) by causing the actuator 430 to move the second mold 420 toward first mold 410 and/or first mold 410 toward second mold 420 (e.g., to close mold assembly 400 and/or otherwise reduce a space between the first mold 410 and the second mold 420). As another example, press apparatus 401 can be configured to press a workpiece by causing the actuator to move each of the first mold 410 and the second mold 420 towards each other. Generally, second mold 420 and/or first mold 410 can be driven to move, for example, in a direction substantially parallel with the Y-axis, such as to close and open mold assembly 400. In some embodiments, press apparatus 401 can include, for example, a double sided press, including an open or at least partially open frame (e.g., the frame 440) and a hose-type pressing member or actuator 430.

In some embodiments, the mold assembly 400 can define a mold cavity that receives a workpiece (e.g., the workpieces 102 and/or 202) and the press apparatus 401 can be configured to facilitate loading of the workpiece and/or retention of the workpiece in the mold cavity via a vacuum. For example, mold assembly 400 can be configured for use in conjunction with a vacuum pump, chamber, and/or device configured to exert a suction force on one or more surfaces of a workpiece.

As shown in FIGS. 9 and 10, the mold assembly 400 includes the first mold 410 and the second mold 420. The first mold 410 has a first surface 412 to which the first liner 414 can be at least temporarily coupled (e.g., via an adhesive, mechanical fastener(s), interference or friction coupling, vacuum, and/or the like). The second mold 420 has a second surface 422 to which the second liner 424 can be at least temporarily coupled (e.g., via an adhesive, mechanical fastener(s), interference or friction coupling, vacuum, and/or the like). As shown in FIG. 10, in some embodiments, the first liner 414 can have a thickness that is greater than a thickness of the second liner 424. In other embodiments, the liners 414 and 424 can be substantially the same. Moreover, the arrangement of the liners 414 and 424 can be such that the liners 414 and 424 include corresponding contours or curvatures that can be offset, for example, to account for a thickness of the workpiece. As described in detail above, the liners 414 and 424 can be formed from a relatively compliant and/or visco-elastic material such as, for example, polyurethane or the like, which can allow the liners 414 and/or 424 (or at least a portion thereof) to deform during a pressing process. As such, the arrangement, configuration, and/or material composition of the liners 414 and/or 424 can be such that the mold assembly 400, in response to actuation of the actuator 430, applies a load with a substantially uniform pressure across the surfaces of the workpiece that are adjacent to or in contact with the liners 414 and 424.

Advantageously, the liners (e.g., liners 114, 124, 414, and/or 424) of the present disclosure can absorb stress concentrations resulting from variations in thickness in a workpiece such as, for example, 'bulging' that can occur due to the reinforcement patches (e.g., the patches 104A-104D and/or 204A-204D) in a skateboard deck being manufactured or pressed as described herein. Without the compliant material the patches—being made of an incompressible composite material (e.g., fiberglass)—could be pressed into one or more softer or compressible layers of the deck (e.g., one or more of the wood layers), thereby creating a stress riser(s) resulting in a weaker deck. As described herein, the compliant liners can be used on both the first mold surface and the second mold surface since, for example, the patches can result in bulges on both a top and a bottom surface of the deck. In some instances, the deck can remain in the press and under compression for 30-45 minutes and then removed and allowed to fully cure.

Figure 11:
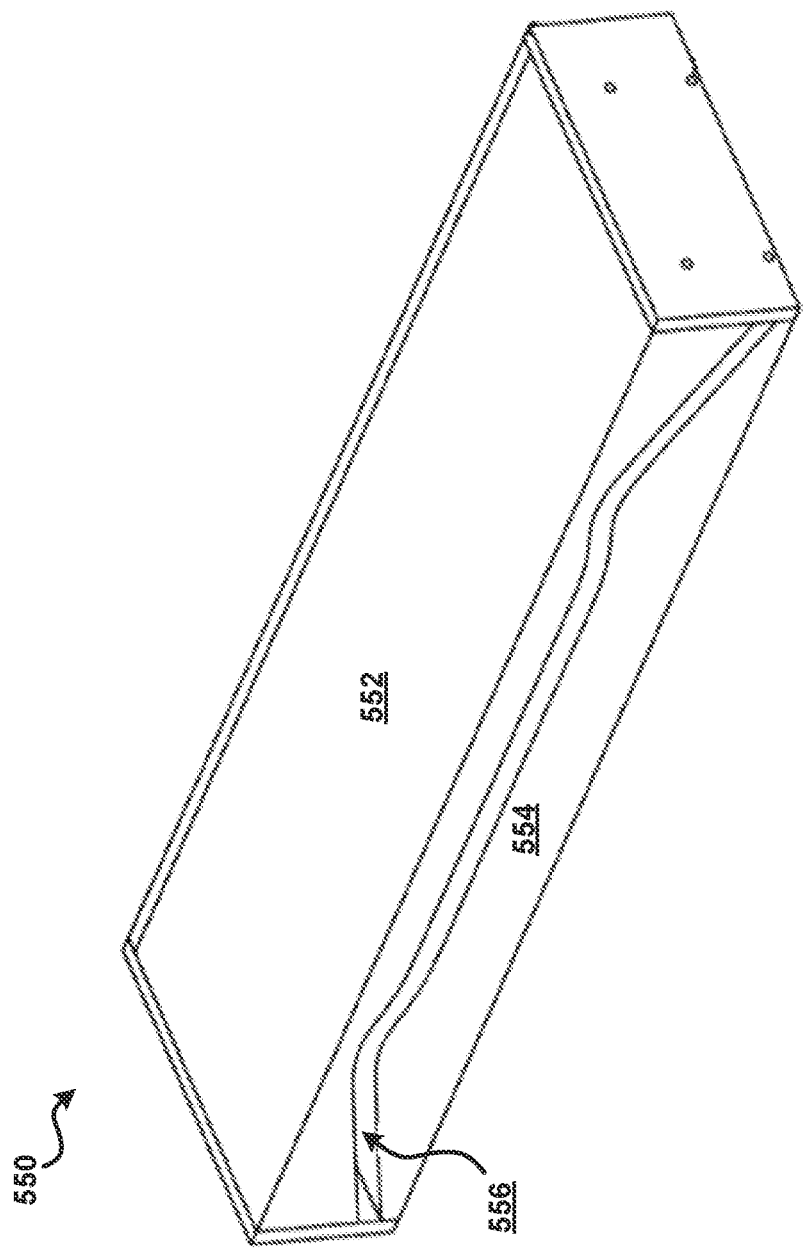
FIG. 11 is a perspective view depiction of an example of a casting mold for casting a liner included in the press assembly depicted in FIG. 8.

FIG. 11 is schematic depiction of an example of a casting mold ("casting mold 550") for casting a liner of any of the mold assemblies described herein (e.g., the mold assembly 100 and/or 400), according to an embodiment. The liner can be structurally and/or functionally similar to any of the liners described herein (e.g., first liner 114 and/or second liner 124, first liner 414 and/or second liner 424). As shown, casting mold 550 includes a first casting mold 552 and a second casting mold 554 that collectively define a casting mold cavity 556.

Casting mold 550 can be or can include any suitable type of casting mold. Casting mold 550 can be configured for casting of a compliant layer, compliant liner, and/or the like (e.g., one or more of the first liners 114, 414 and/or the second liners 124, 424). In some embodiments, casting mold 550 can be configured for casting of a unitary liner, as described in further detail herein. In some embodiments, casting mold 550 can be configured to receive (e.g., in the mold cavity 556) any suitable material for cast molding. For example, in some embodiments, the casting mold 550 can be used to cast a compliant liner formed from or of polyurethane (e.g., polyurethane has a hardness of 90 Shore A) or other visco-elastic material(s). Casting mold 550 can otherwise be configured to receive any suitable material, such as a compliant material having a compressive strength such that, in use (e.g., as described with reference to FIGS. 1-2) the material deforms when a pressure exceeds a pressure threshold or otherwise satisfies a criteria(ion), thereby allowing for a uniform pressure to be exerted on a workpiece.

As an example, patches (e.g., the patches 104A-104D and/or 204A-204D) in a workpiece (e.g., the workpiece 102 and/or 202, respectively) can cause a variation in thickness in a portion of the workpiece, which in turn, can result in a rise in pressure on those areas of the workpiece that could otherwise deform or crush the workpiece at or near a patch zone. The casting mold (e.g., casting mold 550) can allow for the thickness of the decks (e.g., workpiece 102 and/or 202) so two machined parts are required for both the top and bottom mold surfaces (e.g., first surface 112, 412 and/or second surface 122, 422). That is, the top and bottom mold surfaces may be machined to conform with and/or otherwise result in a desired final shape of the mold (e.g., first mold 110, 410 and/or second mold 120, 420) after the urethane for the mold assembly (e.g., mold assembly 100) is cast. That part of the machined portions of the first mold 110, 410 and the second mold 120, 420 can be reused while the cast compliant liners will wear out and need to be replaced. Thus, casting mold 550 can be used to cast any number of compliant liners.

In some embodiments, casting mold 550 can be configured to cast a unitary compliant liner, such as a cast polyurethane (PU) bladder, a cast PU unitary liner, and/or the like. In some embodiments, such a unitary compliant liner can be configured to be connected to a lid of a press. In some embodiments, the unitary compliant liner can be configured to be connected to mold assembly 400, on, about, or adjacent to a portion or region of the frame 440 (FIG. 8) and the first mold 410 or the second mold 420 can be configured to move relative to the unitary compliant liner. In other embodiments, the unitary compliant liner can be coupled to one of the first mold 410 or the second mold 420.

In some embodiments, structures and/or functionalities of the various components of mold assembly 400 can be combined into a single component. For example, in some embodiments, mold assembly 400 can include three discrete components, including the first mold 410, the second mold 420, and a unitary liner (not shown). In some such embodiments, the unitary liner can be cast, such as described in further detail herein. Mold assembly 400 can alternatively or otherwise include any suitable number and/or types of components.

Figure 12:
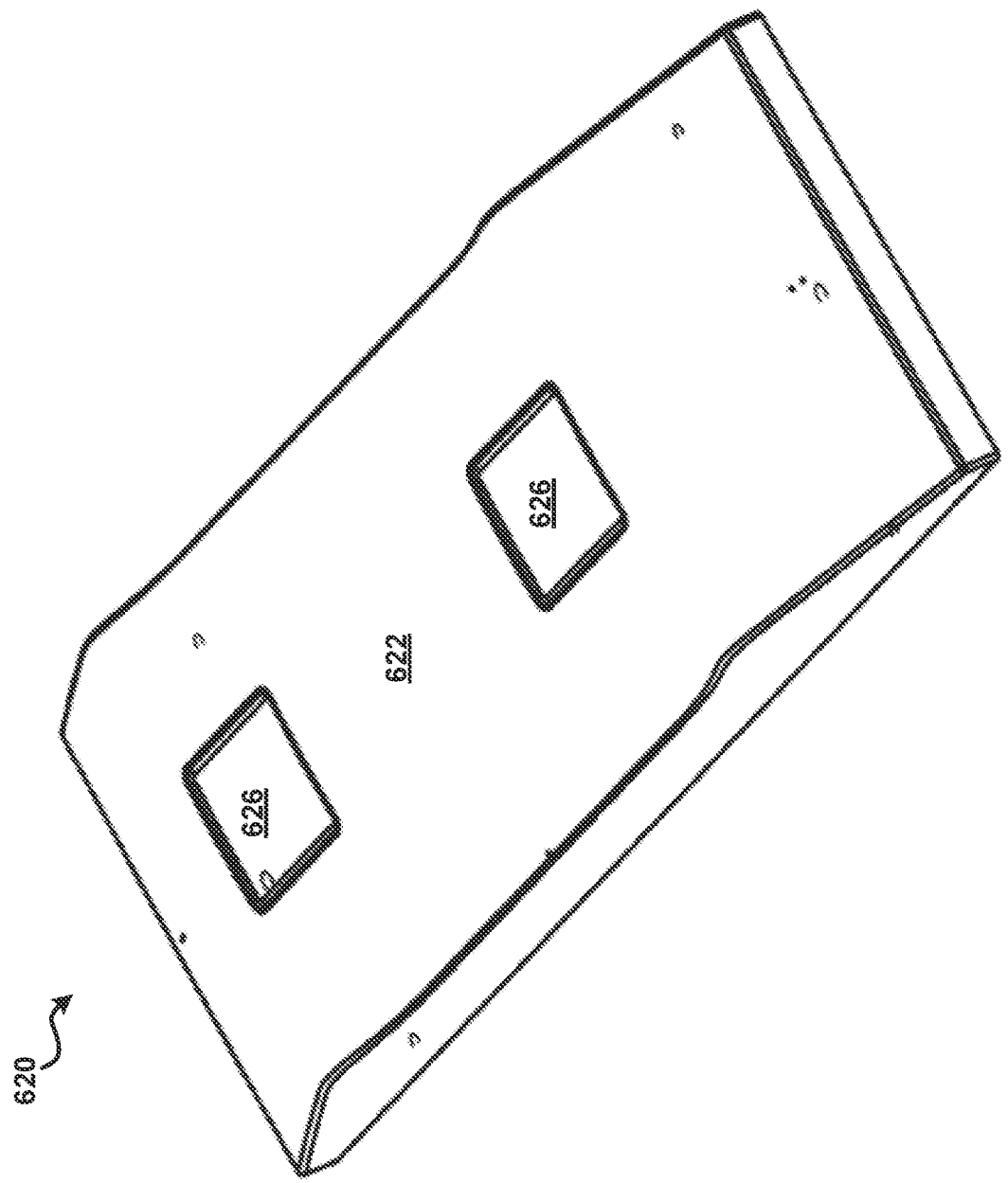
FIG. 12 is a perspective view depiction of a mold, according to an embodiment.

FIG. 12 is schematic depiction of an example of a mold 620, according to an embodiment. Mold 620 can be structurally and/or functionally similar to any of the molds described herein. For example, mold 620 can be included in a mold assembly such as the mold assembly 100 and/or 400. As shown, the mold 620 includes a surface 622 that is configured to be placed in contact with a workpiece to exert a force, load, and/or pressure thereon.

As described above with reference to the molds 110, 410 and/or 120, 420, the surface 622 of the mold 620 can be configured to collectively define and/or form (e.g., in conjunction with a surface of a second or corresponding mold) a mold cavity configured to receive a workpiece (e.g., the workpiece 102 and/or 202). The surface 622 can be formed from or of any suitable material and can be configured to have any suitable shape, size, and/or geometry (e.g., surface geometry) for pressing a workpiece in a desired manner. Moreover, the mold 620 and/or at least the mold surface 622 can be formed from any suitable material. For example, in some embodiments, the mold 620 and/or mold surface 622 can be formed from a metal or relatively hard polymer or plastic. In other embodiments, the mold 620 and/or the mold surface 622 can be formed from a relatively compliant material such as, for example, those described above with reference to the liners 114, 414, 124, and 424. In some embodiments, the mold 620 and/or mold surface 622 can be formed from a metal or relatively hard polymer or plastic and can be configured to be used with an opposite or corresponding mold that is formed from a relatively compliant material or that has a mold surface that is formed from a relative compliant material.

In some embodiments, the surface 622 can include one or more surface features configured to accommodate and/or correspond to one or more features or characteristics of a workpiece. For example, in the embodiment shown in FIG. 12, the surface 622 includes a set of recesses 626. In other embodiments, the surface 622, for example, can include, form, and/or define one or more protrusions, ribs, bumps, tabs, pockets, concavities, depressions, detents, curves, arcs, slopes (e.g., sloped or inclined surface), and/or the like.

The set of recesses 626 of the surface 622 can be any suitable shape, size, and/or configuration. For example, a size, shape, and/or configuration of the recesses 626 can be based at least in part on a size, shape, and/or configuration of a corresponding portion of a workpiece. Similarly, the set of recesses 626 can include any number of recesses based at least in part on a number of corresponding portions of the workpiece. In the embodiment shown in FIG. 12, the set of recesses 626 includes two recesses, each of which is configured to receive a part of a workpiece (e.g., the workpiece 102 and/or 202) when the workpiece is disposed in the mold cavity.

For example, in some embodiments, the workpiece can be a skateboard deck such as those described herein. As such, the skateboard deck can include a set of patches that can result in corresponding variations in thickness of the deck. Accordingly, a size, shape, number, arrangement, and/or configuration of the recesses 626 can be based at least in part on the patches included in the deck. Moreover, each of the recesses 626 can be configured to receive a portion of the deck that corresponds with and/or is aligned with one of the patches. The recesses 626 can have a depth that allows for and/or otherwise accommodates the increase in thickness of the deck at or near the patches. Thus, the mold 620 can be used to press the deck (as described herein) and, the arrangement of the recesses 626 can be such that, despite the variations in thickness, a substantially uniform pressure is exerted on the deck (e.g., workpiece). In some instances, the recesses 626 can allow for the application of the substantially uniform pressure on the deck without having the mold 620 and/or mold surface 622 deform in response to the applied pressure (e.g., as described above with reference to the liners 114, 414, 124, and/or 424). In other instances, the mold 620 or mold surface 622 can be formed from a relatively compliant material that can at least partially deform in response to the applied pressure.

Figure 13:
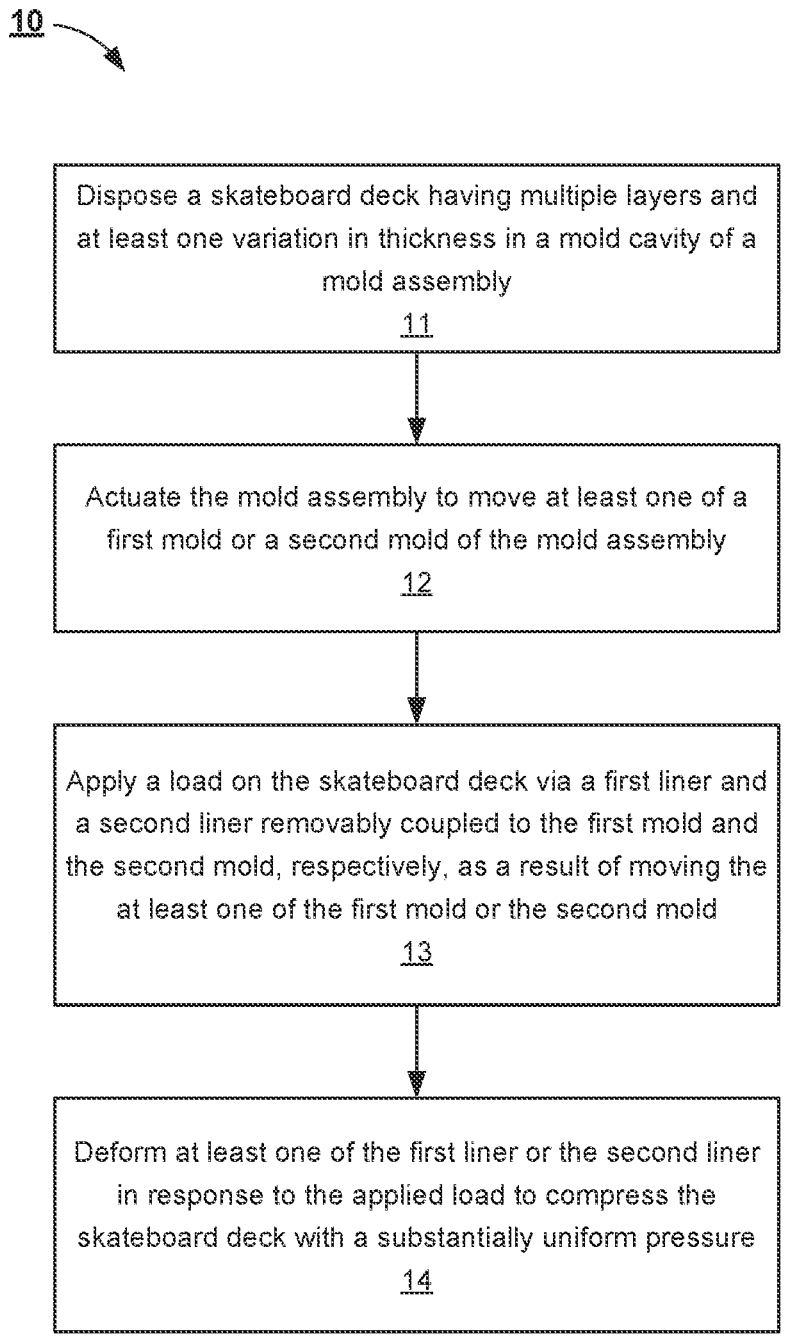
FIG. 13 is a flowchart illustrating a method of pressing a workpiece having at least one variation in thickness, according to an embodiment.

Referring now to FIG. 13, a flowchart is provided showing a method 10 of compressing a workpiece having at least one variation in thickness according to an embodiment. As described in detail above, the workpiece can be, for example, a multi-layered skateboard deck such as any of those described herein. In some instances, for example, the workpiece is a seven-layered skateboard deck that includes a set of patches (e.g., two patches, four patches, or more) that results in the variation(s) in thickness of the skateboard deck, as described in detail above with reference to the skateboard deck 202. In some instances, one or more of the layers of the skateboard deck can be formed of a composite material. In some instances, the set of patches can be formed of the composite material. In some implementations, the inclusion of the layers formed of the composite material and the variations in thickness as a result of the set of patches can be such that pressing the deck using standard techniques results in unequal pressure being applied along the skateboard deck, which can damage one or more layers of the deck and/or can reduce a strength of the deck. Advantageously, compressing the skateboard deck via the method 10 can, in some implementations, overcome such issues.

The method 10 includes disposing in a mold cavity of a mold assembly a skateboard deck having a plurality of layers and at least one variation in thickness, at 11. As described in detail above, the mold assembly can include a first mold, a second mold, a first liner removably coupled to the first mold, and a second liner removably coupled to the second liner. The first liner and the second liner can collectively define the mold cavity. In some implementations, the first liner and/or the second liner can be formed of a relatively soft and/or flexible material allowing for a desired amount of elastic (i.e., non-permanent) deformation in response to an applied load, as described in detail above.

The mold assembly is actuated to move at least one of the first mold or the second mold, at 12. For example, in some implementations, the mold assembly can include an actuator such as a pneumatic or hydraulic jack and/or the like, as described above with reference to the press apparatus 401 shown in FIG. 8.

As a result of moving the first mold and/or the second mold, a load is applied on the skateboard deck via the first liner and the second liner, at 13. For example, when the skateboard deck is disposed in the mold cavity, the movement of the first mold and/or the second mold can reduce a height of the mold cavity to an extent that each of the first liner and the second liner is placed in contact with a surface of the skateboard deck. In this manner, additional movement of the first mold and/or the second mold after an initial contact with the skateboard deck can result in a load or pressure being exerted by the first liner and the second liner on the skateboard deck.

At least one of the first liner or the second liner is deformed in response to the applied load to compress the skateboard deck with a substantially uniform pressure, at 14. For example, as described above, the skateboard deck can have one or more variations in thickness as a result of one or more patches being disposed between adjacent layers of the skateboard deck. In some implementations, the patches can be disposed at positions along the skateboard deck where the trucks are mounted to the deck. Thus, the patches can reinforce the skateboard deck at positions that experience increased stress and/or that otherwise include or encounter stress concentration risers. The reinforcing patches, however, increase a thickness of the portion of the skateboard where the patches are present. Thus, when pressed, at least one of the first liner and/or the second liner can deform at a position(s) associated with the patches such that a uniform amount of pressure is exerted on the skateboard deck regardless of the variation in thickness as a result of the one or more patches. Furthermore, in some implementations, the material forming the first liner and/or the second liner and/or one or more characteristics of the first liner and/or the second liner can be selected such that the deformation occurs when a predetermined and/or desired amount of pressure is exerted on the skateboard deck, thereby reducing a likelihood of over-compressing the skateboard deck. As such, the method 10 can be used to compress a skateboard deck (and/or any other suitable workpiece) having one or more variations in thickness.

While various embodiments have been particularly shown and described, it should be understood that they have been presented by way of example only, and not limitation. Various changes in form and/or detail may be made without departing from the spirit of the disclosure and/or without altering the function and/or advantages thereof unless expressly stated otherwise. Where schematics and/or embodiments described above indicate certain components arranged in certain orientations or positions, the arrangement of components may be modified.

Although various embodiments have been described as having particular features and/or combinations of components, other embodiments are possible having a combination of any features and/or components from any of embodiments described herein, except mutually exclusive combinations. The embodiments described herein can include various combinations and/or sub-combinations of the functions, components, and/or features of the different embodiments described.

The specific configurations of the various components can also be varied. For example, the size and specific shape of the various components can be different from the embodiments shown, while still providing the functions as described herein. More specifically, the size and shape of the various components can be specifically selected for a desired or intended usage. Thus, it should be understood that the size, shape, and/or arrangement of the embodiments and/or components thereof can be adapted for a given use unless the context explicitly states otherwise.

Where methods and/or events described above indicate certain events and/or procedures occurring in certain order, the ordering of certain events and/or procedures may be modified. Additionally, certain events and/or procedures may be performed concurrently in a parallel process when possible, as well as performed sequentially as described above.

What is claimed is:

1. A method, comprising:
   disposing a skateboard deck in a mold cavity of a mold assembly,
   wherein the skateboard deck has a plurality of layers including a set of composite layers, a set of core layers, and a wood veneer forming a bottom layer of the skateboard deck, the skateboard deck further having a plurality of patches causing at least one variation in a thickness of the skateboard deck, and
   wherein the mold assembly includes a first mold, a second mold, a first liner removably coupled to the first mold, and a second liner removably coupled to the second mold, the first liner and the second liner collectively defining the mold cavity and being formed of a compressible material having a compressive strength less than a compressive strength of a material forming each layer of the skateboard deck;
   actuating the mold assembly to move at least one of the first mold or the second mold;
   applying a load on the skateboard deck via the first liner and the second liner as a result of moving the at least one of the first mold or the second mold; and
   deforming at least one of the first liner or the second liner in response to the applied load to compress the skateboard deck with a substantially uniform pressure without substantially pressing the plurality of patches into at least the set of core layers.

2. The method of claim 1, wherein the deforming the at least one of the first liner or the second liner is in response to a pressure exerted on a portion of the skateboard deck reaching a predetermined threshold pressure.

3. The method of claim 1, wherein the plurality of layers includes at least two layers formed of a composite material, and
   the plurality of patches including a first patch and a second patch formed of a composite material, each of the first patch and the second patch being disposed between two adjacent layers from the plurality of layers and having a size smaller than each layer from the plurality of layers, the first patch resulting in a first variation in thickness along a first portion of the skateboard deck and the second patch resulting in a second variation of thickness along a second portion of the skateboard deck separate from the first portion.

4. The method of claim 3, wherein the first liner defines (i) a first recess in a first position along the first liner that is substantially axially aligned with the first portion of the skateboard deck disposed in the mold cavity and (ii) a second recess in a second position along the first liner that is substantially axially aligned with the second portion of the skateboard deck disposed in the mold cavity, and the applying the load on the skateboard deck includes applying the load while the first portion of the skateboard deck is at least partially disposed in the first recess and the second portion of the skateboard deck is at least partially disposed in the second recess.

5. The method of claim 1, further comprising:
casting, via a liner mold, a unitary liner forming at least one of the first liner or the second liner.

6. The method of claim 1, wherein the mold assembly is a mold assembly of a press.

7. The method of claim 1, wherein the set of composite layers includes a first composite layer and a second composite layer, and the set of core layers includes a first core layer, a second core layer, a third core layer, and a fourth core layer.

8. The method of claim 7, wherein the plurality of patches includes a first patch, a second patch, a third patch, and a fourth patch.

9. The method of claim 8, wherein prior to disposing the skateboard deck in the mold cavity, the method further comprising:

placing the third patch at a first target location along a first surface of the first core layer and the fourth patch at a second target location along the first surface of the first core layer;

placing the second composite layer on the first surface of the first core layer such that the second composite layer covers the third patch and the fourth patch;

placing the second core layer on a second surface of the first core layer, the second surface of the first core layer being opposite the first surface of the first core layer;

placing the third core layer on the second core layer;

placing the fourth core layer on the third core layer such that a first surface of the fourth core layer is in contact with the third core layer;

placing the first patch at a first target location on a second surface of the fourth core layer and the second patch at a second target location on the second surface of the fourth core layer, the second surface of the fourth core layer being opposite the first surface of the fourth core layer;

placing the first composite layer on the second surface of the fourth core layer such that the first composite layer covers the first patch and the second patch; and placing the wood veneer layer on the first composite layer.

10. The method of claim 9, further comprising:
applying bonding material to the second composite layer after placing the second composite layer;

applying bonding material to the second surface of the first core layer before placing the second core layer;

applying bonding material to the second core layer before placing the third core layer;

applying bonding material to the third core layer before placing the fourth core layer; and applying bonding material to the first composite layer after placing the first composite layer and before placing the wood veneer layer.

11. The method of claim 1, wherein each patch from the plurality of patches is comprised of an incompressible composite material.

12. The method of claim 1, wherein deforming at least one of the first liner or the second liner substantially prevents the plurality of patches from being compressed pressed into the wood veneer layer.

* * * * *